US011004103B2

(12) United States Patent
Monaco et al.

(10) Patent No.: US 11,004,103 B2
(45) Date of Patent: May 11, 2021

(54) CUSTOM REWARDS PROTOCOL AND SYSTEM ARCHITECTURE

(71) Applicant: Bank of America Corporation, Charlotte, NC (US)

(72) Inventors: Mark Churchill Monaco, New York, NY (US); Tony England, Tega Cay, SC (US); Matthew D. Murphy, Charlotte, NC (US); David C. Tyrie, Boston, MA (US)

(73) Assignee: Bank of America Corporation, Charlotte, NC (US)

( * ) Notice: Subject to any disclaimer, the term of this patent is extended or adjusted under 35 U.S.C. 154(b) by 249 days.

(21) Appl. No.: 15/977,233

(22) Filed: May 11, 2018

(65) Prior Publication Data

US 2019/0147483 A1 May 16, 2019

Related U.S. Application Data

(60) Provisional application No. 62/586,409, filed on Nov. 15, 2017.

(51) Int. Cl.
*G06Q 30/00* (2012.01)
*G06Q 30/02* (2012.01)
(Continued)

(52) U.S. Cl.
CPC ....... *G06Q 30/0238* (2013.01); *G06Q 20/027* (2013.01); *G06Q 20/065* (2013.01); *G06Q 20/102* (2013.01); *G06Q 20/20* (2013.01); *G06Q 20/202* (2013.01); *G06Q 20/227* (2013.01); *G06Q 20/24* (2013.01); *G06Q 20/387* (2013.01); *G06Q 20/40* (2013.01);
(Continued)

(58) Field of Classification Search
None
See application file for complete search history.

(56) References Cited

U.S. PATENT DOCUMENTS 7,516,883 B2   4/2009   Hardesty et al.
7,624,068 B1 * 11/2009  Heasley .............. G06Q 20/10
                                                  705/38

(Continued)

OTHER PUBLICATIONS

Walgreens rewards and coupon policies 101, May 8, 2014, Capital Broadcasting Company (Year: 2014).*

(Continued)

*Primary Examiner* — Naresh Vig
(74) *Attorney, Agent, or Firm* — Weiss & Arons LLP; Michael A. Springs, Esq.

(57) ABSTRACT

Apparatus, methods and architectures for dynamically incentivizing use of payment instrument(s) by customer(s) on purchase(s) from merchant(s) are described. Methods, apparatus and architectures may include/involve providing electronic platform(s) for enabling customer reward option(s). Reward option(s) may include standard reward option(s) associated with interchange fee(s) upon acquirer(s) affiliated with the merchant(s). Reward option(s) may include custom reward option(s) funded by the merchant(s) and associated with discounted interchange fee(s). Discounted interchange fee(s) may incentivize reduced cost(s) of acceptance imposed on merchant(s) by acquirer(s). The reward options may be selected to drive incremental sales to participating merchant(s).

4 Claims, 11 Drawing Sheets

(51) Int. Cl.
  *G06Q 20/40* (2012.01)
  *G06Q 20/20* (2012.01)
  *H04L 9/06* (2006.01)
  *G06Q 20/22* (2012.01)
  *G06Q 20/02* (2012.01)
  *G07G 1/00* (2006.01)
  *G06Q 20/06* (2012.01)
  *G06Q 20/10* (2012.01)
  *G06Q 20/38* (2012.01)
  *G06Q 20/24* (2012.01)
  *H04W 4/30* (2018.01)
  *G06Q 50/00* (2012.01)

(52) U.S. Cl.
  CPC ..... *G06Q 20/4016* (2013.01); *G06Q 30/0213* (2013.01); *G06Q 30/0217* (2013.01); *G06Q 30/0226* (2013.01); *G06Q 30/0233* (2013.01); *G06Q 30/0234* (2013.01); *G06Q 30/0235* (2013.01); *G06Q 30/0258* (2013.01); *G06Q 30/0269* (2013.01); *G07G 1/0009* (2013.01); *H04L 9/0637* (2013.01); *G06Q 50/01* (2013.01); *H04L 2209/38* (2013.01); *H04W 4/30* (2018.02)

(56) References Cited

U.S. PATENT DOCUMENTS

| | | |
|---|---|---|
| 8,682,791 B2 | 3/2014 | Bies et al. |
| 9,665,879 B2 | 5/2017 | Aloni et al. |
| 9,697,520 B2 | 7/2017 | MacIlwaine et al. |
| 9,818,266 B2 | 11/2017 | Murphy |
| 9,836,743 B2 | 12/2017 | Celikyilmaz et al. |
| 9,846,888 B2 | 12/2017 | Perreault et al. |
| 2002/0042743 A1* | 4/2002 | Ortiz ................ G06Q 30/0207 705/14.38 |
| 2002/0143708 A1* | 10/2002 | Hollander et al. ..... G06Q 20/12 705/72 |
| 2008/0103968 A1* | 5/2008 | Bies ...................... G06Q 20/10 705/39 |
| 2013/0060623 A1* | 3/2013 | Walker ................. G06Q 50/01 705/14.27 |
| 2013/0254009 A1 | 9/2013 | Barr |
| 2014/0214509 A1* | 7/2014 | Lee .................... G06Q 30/0234 705/14.17 |
| 2014/0372238 A1 | 12/2014 | Murphy et al. |
| 2015/0220958 A1* | 8/2015 | Tietzen ............. G06Q 30/0236 705/14.15 |
| 2015/0254615 A1 | 9/2015 | Karim |
| 2016/0203522 A1* | 7/2016 | Shiffert ............. G06Q 30/0267 705/14.58 |
| 2016/0232556 A1 | 8/2016 | Postrel |
| 2017/0017942 A1 | 1/2017 | Nix et al. |
| 2017/0330217 A1 | 11/2017 | Po Strel |

OTHER PUBLICATIONS

Electronic Data Interchange, Jun. 6, 2016, wikipedia.com, date is in the URL in YYYYMMDD format (Year: 2016).*

* cited by examiner

CUSTOM REWARDS PROTOCOL AND SYSTEM ARCHITECTURE

CROSS-REFERENCE TO RELATED APPLICATION

This application is a non-provisional of U.S. Provisional Patent Application No. 62/586,409, which was filed on Nov. 15, 2017, and is hereby incorporated by reference herein in its entirety.

FIELD OF TECHNOLOGY

Aspects of the disclosure relate to providing apparatus and methods for a rewards architecture. Specifically, aspects of the invention relate to providing apparatus and methods for a custom rewards architecture with a custom protocol that enables transaction participants to utilize the architecture in real-time.

BACKGROUND OF THE DISCLOSURE

In an electronic payment scenario, a customer (the "customer") may purchase from a merchant or service provider ("the merchant") goods or services ("the product") using credit or by debiting an asset account (for example, using a card such as debit card or card that debits another type of asset account such as a card for debiting a prepaid account, a card for debiting an Automated Clearing House (ACH) account or a card (or other mechanism) for debiting another suitable asset account). The credit may be extended to the customer by an issuing bank (the "issuer"). The asset account may reside at the issuing bank or be held by another entity. The merchant presents the transaction to an acquiring bank (the "acquirer"). The acquirer pays the merchant for (and thus "acquires") the product. A transaction processing network in communication with the issuer and the acquirer settles the transaction between the issuer and the acquirer. The transaction processing network may collect transaction processing network fees from the issuer and the acquirer in connection with a settlement.

Settling the transaction may include the transaction network receiving a plurality of transactions from the acquirer. Each of the plurality of transactions may comprise an amount authorized by the issuer. The transaction network may debit an account of the issuer for the amount authorized and credit the amount authorized to an account of the acquirer.

Settlement may include a transfer of funds between two or more transaction participants. The transfer may be a "book transfer," an inter-bank transfer or any suitable transfer between the transaction participants. A settlement network may transfer the funds between the transaction participants. Illustrative settlement networks may include the Federal Reserve Wire Network ("Fedwire") and other suitable settlement networks that are well known to those of ordinary skill in the art. The settlement network may be any suitable network linking one or more accounts of the transaction participants.

One transaction participant may impose a fee upon another transaction participant for participating in the transaction. The fee may be referred to as "interchange." Interchange may be a fixed fee for the transaction or a percentage of the transaction. Interchange may be a fixed fee and/or a percentage of the transaction.

Interchange flows from the acquirer, through the transaction processing network, to the issuer. For example, the issuer may transfer to the acquirer a purchase amount of the product, net interchange. The issuer typically uses interchange to cover costs of acquiring credit card customers, servicing credit card accounts, providing incentives to retain customers, mitigating fraud, covering customer credit risk, group compensation and other expenses.

The acquirer may deduct a "transaction cost" from the amount that the acquirer pays the merchant in exchange for the product. The transaction cost may cover the acquirer's transaction processing network fee, interchange, and/or other expenses.

FIG. 1A shows typical credit card transaction flow 100. Flow 100 involves transaction participants such as the merchant, the customer, and transaction service providers that are identified below.

At step 1 of FIG. 1A, the merchant provides information, relating to a proposed transaction between the merchant and a customer, to a transaction authorization and clearance provider. The transaction authorization and clearance provider may be a transaction processing network. The transaction authorization and clearance provider may provide transaction authorization and clearance information to the merchant. The transaction authorization and clearance information may include authorization for the transaction to proceed.

At step 2 of FIG. 1A, the merchant provides $100 in product to the customer. The customer pays with a credit card.

At step 3 of FIG. 1A, the issuer transmits to the customer a statement showing the purchase price ($100.00) due. The issuer collects the purchase price amount, along with interest and fees if appropriate, from the customer.

At step 4 of FIG. 1A, the issuer routes the purchase price amount ($100.00) through the transaction processing network to the acquirer. At step 5, the acquirer partially reimburses the merchant for the purchase price amount. In the example shown in FIG. 1A, the partial reimbursement is $98.00. The difference between the reimbursement amount ($98.00) and the purchase price amount ($100.00) is a two-dollar ($2.00) transaction cost.

At step 6 of FIG. 1A, issuer transfers $0.05 to the the transaction processing network, to the issuer.

At step 7 of FIG. 1A, both the acquirer and the issuer pay a transaction processing network fee ($0.07 for acquirer and $0.05 for the issuer) to the transaction processing network.

At step 8 of FIG. 1A, the issuer pays a reward ($1.00) to the customer. Illustrative net positions are shown below in Table 1.

TABLE 1

| Net positions, by participant, based on transaction flow 100 (shown in FIG. 1A). | |
|---|---|
| Participant | Net ($) |
| Issuer | 0.45 |
| Acquirer | 0.43 |
| Transaction processing network | 1.62 |
| Merchant | −2.00 |
| Customer | 1.00 |

In settlement 100 (shown in FIG. 1A), the transaction fee is based on an exemplary merchant discount rate of 2%. The $1.50 interchange is based on an exemplary interchange rate of 1.5%. The sum of the transaction processing network fees ($0.07 and $0.05) is based on a total exemplary transaction processing network fee rate of 0.12%.

Transaction processing networks and transaction processing network services are offered under trademarks known to those of ordinary skill in the art. Transaction processing networks may set interchange rates. Issuers may refund or reimburse all and/or a portion of the merchant's cost of acceptance. Interchange rates often depend for each transaction processing network on merchant type and size, transaction processing method, transaction volume and other factors.

Currently, issuers may offer reward programs associated with credit and/or debit payment instruments. Such payment instruments may include credit cards, debit cards, instruments or devices that include a contact chip, such as an ISO14443-compliant contactless chip, or other electronic purchasing devices such as smart phones or tablets (collectively hereinafter, payment instruments). Payment instruments may include payment instrument information stored on a mobile device (e.g., smart phone) or accessible via a mobile device. Illustrative payment instrument information is shown below in Table 2.

TABLE 2

Illustrative Payment Instrument Information

Issuer
Transaction network
Customer name
Expiration date
Card security code ("CSC")
Card verification data ("CVD")
Card verification value ("CVV," "CVV2," "iCVV" or "Dynamic CVV")
Card verification value code ("CVVC")
Card verification code ("CVC" or "CVC2")
Verification code ("V-code")
Card code verification ("CCV")
Signature panel code ("SPC")
Customer identification number ("CID")
Card account number
Brand
Rewards Program ID
Affinity Rewards programs may deepen current customer relationships and attract new customers. Rewards programs may offer customers incentives to use their payment instruments to purchase goods or services from merchants. Illustrative rewards include perks such as upgrades, cash-back, air lines miles or "points." Points may be utilized to obtain goods or services from qualifying merchants. Customers typically earn points by making qualifying purchases using a payment instrument provided by the issuer.

Typically, rewards programs are funded by the issuer and do not promote merchant specific spend, brand or message.

Merchants may pay fees, such as a cost of acceptance, to the acquirer. The fees may include terminal rental fees, network fees and/or other fees, for processing payment instrument payments. Based on an amount included in the fees paid by the merchants, an issuer receive compensation for accepting a credit risk associated with payment instruments and/or other costs associated with administering a card program. The issuer may allocate, directly or indirectly, a portion of the compensation to fund rewards or other programs to promote payment instrument usage.

It would be desirable to provide apparatus and methods for electronic payment system architecture that allows credit, debit and/or ACH payments to be used to accrue merchant sponsored rewards without disrupting strict timing requirements associated with the processing of such payments at a point-of-sale (hereinafter, "POS"). It would be desirable to design a model and associated electronic payment processing architecture that provide customers with reward-type incentives to use payment instruments, but allow issuer to rebate any fees payed by the merchants and allow merchants to control and direct the marketing and loyalty of their brand. Accordingly, it would be desirable to provide apparatus and methods for custom rewards protocols and system architecture.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1A:
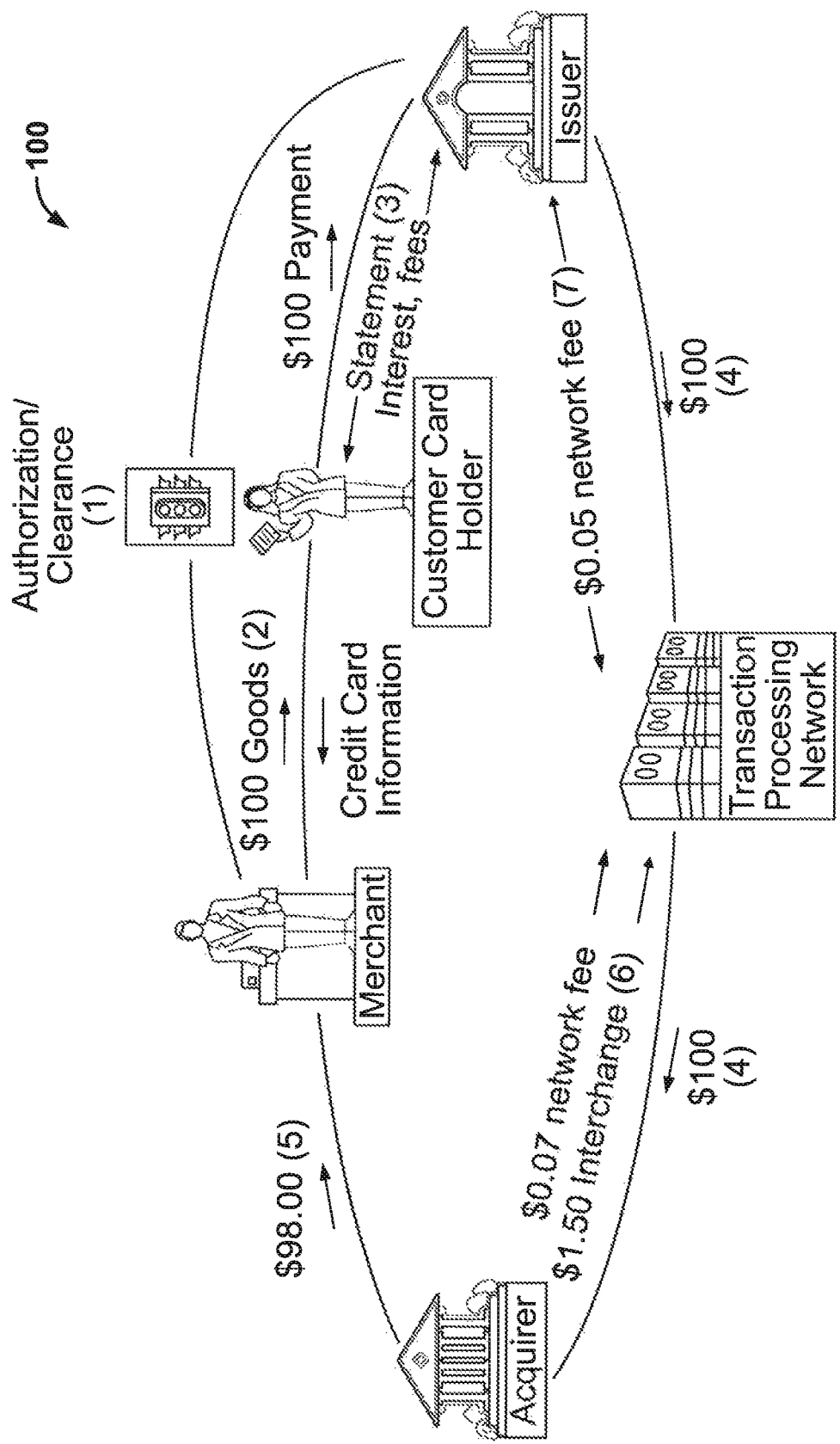
FIG. 1A shows an illustrative system architecture in accordance with principles of the invention.

Protocols and architecture described herein may implement custom reward programs. A custom reward program may include a merchant-funded rewards program. A merchant may identify one or more rewards it wishes to make available to its customers. For example, an eatery may offer a free drink after a customer has spent a requisite amount of money at the eatery or has dined a threshold number of times at the eatery. The merchant may strategically identify a reward that provides a larger perceived value than an actual cost or price of the reward.

Such rewards may be non-monetary such as upgrades, free items, enhanced service and/or preferred service times. Rewards may include monetary rewards such as cash-back. Rewards may be provided instantly at a point of sale (POS), applied as an instant statement credit or accrued and redeemed at specified or selected times intervals.

Whatever the reward, it is funded by the merchant. In some embodiments, the reward may be jointly funded by the merchant and the issuer. In some embodiments, the merchant may partner with any suitable party to offer and fund a reward.

In some embodiments, the merchant may provide information about available rewards to the issuer. The issuer may promote the reward to customers (e.g., payment instrument holders). For example, the issuer may display the reward to customers from within an app or online banking portal provided to customers by the issuer.

The merchant may promote the available reward. The merchant may promote the reward in its store locations (online or brick and mortar) using any suitable media or medium. The merchant may display the reward to customers from within an app provided to customers by the merchant.

An app running on a mobile device, such as a smart phone, may push notifications to customers regarding available merchant-funded rewards. When the app is provided by a relatively high-profile issuer (e.g., an issuer with many more customers than a merchant), the less visible merchants may be provided access to a top tier mobile app and larger pool of customers than would have typically be available to the merchant.

The merchant may leverage availability of the reward to drive customer traffic to the merchant's locations and products/services. The merchant may leverage the reward to drive customer traffic to slower grossing locations. Merchant funding the reward may, directly or indirectly, promote a payment instrument of the issuer and associated spending on merchant products. The issuer may leverage available rewards to drive customers toward specific payment instruments offered by the issuer and associated with the rewards program.

A customer may be required to affirmatively "opt-in" to a merchant-funded reward program. The customer may opt-in using an electronic platform provided by the issuer or the merchant.

In response to merchant funding of the reward, fees may be lowered, or refunded, for transactions involving customers and/or payment instruments that have opted-in or are otherwise associated with a merchant-funded reward program. It should be noted that, with respect to this application, the terms "lower" and "refund" as used in conjunction with fees may be understood to be synonymous, or substantially synonymous, with one another. The issuer may reimburse, refund or request for arranging of lower fees as a way of passing on savings results from merchant funding of rewards.

Such merchant-funded rewards may increase a volume of payment instrument transactions by enabling and allowing merchants to control a substance of the reward and to control marketing associated with promoting the reward. In response, merchants may receive a reduction in fees.

However, such a rewards model, while novel and innovative, may be associated with a disruption of traditional electronic payment system architecture.

For example, under the new merchant-funded rewards paradigm, functionality may be required for a customer to choose between standard card reward (e.g., issuer-funded rewards) or a merchant-funded reward available from a participating merchant. Functionality would also need to be provided to allow coordination between the issuer and merchant for determining eligibility for rewards and tracking when a reward has been paid out to a customer. This functionality may work with or without participation of the merchant's acquirer.

Such functionality may allow a customer (using a payment instrument) to receive regular product rewards if a merchant-funded reward is not selected or receive regular product rewards if the customer makes a purchase from a merchant that does not participate in the merchant-funded rewards program.

The merchant-funded rewards paradigm may yield reduced cost of acceptance rates for the merchant on purchases associated with activated cards (e.g., customers that have opted-in to a specific reward program offered by the merchant). The paradigm may convert savings on costs of acceptance into directed marketing benefits that may increase sales volume of the merchant. Furthermore, reduced costs of acceptance may be rebated through rebates provided by acquirer to merchant.

The issuer may also derive benefit from partnering with the merchant's promotion of the reward. For example, merchant efforts to promote the rewards also promote the brand, loyalty and purchasing behavior associated with the issuer's purchasing instrument. Such a relationship may provide an economic model that promotes mutually beneficial growth and value.

The customer may also benefit from a merchant-funded reward paradigm. For example, the customer may obtain a reward of greater value (actual or perceived) when the customer selects or "opts-in" to the merchant-funded reward. The customer may also be able to select rewards that better fit their priorities or needs.

By partnering with an issuer, the merchant may link its rewards program to a payment instrument that the customer may use at a variety of merchant locations. The customer benefits from a payment instrument that may be used ubiquitously at different merchant locations in different geographic locations.

The rewards program may also deepen customer loyalty to the merchant and/or issuer. For example, rewards offered by the merchant may be tied to other products or services offered by the merchant. The rewards may include offering the customer faster service or "bonus" products when making what otherwise would have been a routine purchase. Such rewards offered by the merchant may provide an incentive for customers to shop at a participating merchant location to earn and obtain the rewards.

The merchant may benefit by having the merchant's brand promoted as a reward option regardless customer's final rewards selection. The merchant may control marketing messages and behavior requirements delivered to customers. Furthermore, the issuer may promote the merchant's reward using one or more of the issuer's platforms for communication with customers. Additionally, the merchant may benefit by converting savings in card acceptance fees to marketing efforts that may increase sales.

From an issuer's perspective, the custom rewards paradigm provides a new and innovative product that enriches the issuer's value proposition associated with its purchasing instrument products. The issuer may also benefit by acquiring new customers as result of the merchants marketing efforts.

System architecture may include mechanisms whereby merchants can submit rewards options and customers can opt-in to be eligible to earn the rewards alternatives. System architecture may also provide one or more sub-systems that enable deployment of varying fee structure for processing such transactions. The sub-systems may utilize unconventional communication protocols and/or hardware to meet or exceed timing requirements and industry standards associated with processing electronic payments. For example, industry standards may demand that not more than 2-3 seconds elapse from a time a customer swipes a payment instrument at a POS terminal until an authorization response is received from the issuer.

Because merchant-funded rewards may only be available at merchant locations, it may be desirable to determine customer eligibility for such rewards in real time at a POS. It also may desirable to determine customer eligibility for such rewards before the customer approaches a POS. Unconventional communication protocols and/or hardware may, in real-time, determine custom reward eligibility and merchant cost for a transaction.

In some embodiment, the merchant may be credited for fees in a batch settlement at predetermined time intervals.

Notifications of rewards availability may be pushed to customer via mobile device apps. Such apps may be provided by the issuer, merchant or any suitable entity. Rewards availability may be determined based on any suitable factor. Illustrative factors include geolocation, spend analysis, market data and/or social media data.

Embodiments may include a rewards market place. Such a market place may include a real-time market where merchants may submit rewards and allowing customers to select rewards that meet their needs. In some embodiment, merchants may be able to view competitor's rewards submissions. Such a market place may provide a platform for real-time competition for customers.

Embodiments may include rewards routing protocols. Such protocols may include mechanisms by which a merchant is notified of a customer's rewards selection. Such a selection may trigger the customer's payment instrument enrollment in an alternative or bypass transaction processing network. The bypass transaction processing network may automatically track customer reward activity and apply appropriate fee schedules. Fee adjustments may include rebates for acquirer, network and/or interchange fees.

Customer may select reward options such as whether to receive rewards in real-time or accrue rewards eligibility over time. Different rewards may be made available depending on whether the customer selects to accrue rewards or receive them in real-time.

Merchant-funded rewards and corresponding merchant benefits (e.g., transaction cost adjustments) may be tracked at the merchant POS terminal. For example, when a customer who has opted-in to a merchant-funded reward program checks out, fees typically charged to the merchant at the time of the transaction may be reduced or rebated. In some embodiments, the merchant may be responsible for providing systems and architecture for tracking rewards and custom rewards activity. In some embodiments, the issuer may provide systems and architecture for tracking rewards and custom rewards activity. Furthermore, such issuer systems may also track merchant credits for transactions. Credits may be earned by the merchant when a customer uses a payment instrument associated with a merchant-funded reward program. Systems and architecture may include transaction processing network integration to process reduced fees.

Embodiments may include integrating merchant credits and/or custom rewards into digital forms of payment other than traditional credit cards. For example, systems and architecture may integrate with a crypto currency marketplace.

Customers may use any preexisting payment instrument deemed eligible by the issuer for a rewards program. The customer may opt-in to a merchant-funded rewards program. In embodiments, the merchant-funded reward program may be an exclusive rewards program. For example, an opt-in to the merchant-funded reward program may trigger an opt-out of other reward programs. Customers may opt-out of merchant-funded rewards programs at any time. Customers may opt back in to traditional rewards at any time.

To access a merchant-funded rewards program, a customer may use a payment instrument in possession of the customer before the merchant-funded rewards program is rolled out. An issuer may determine eligibility for a merchant-funded reward program. The issuer may provide notification of customer eligibility to a merchant in authorization response provided to the merchant.

Apparatus for a real-time, dynamic offer platform is provided. The platform may include one or more customer devices associated with one or more than one customer. The platform may include a plurality of merchant devices. The platform may include a virtual display. The virtual display may be displayable on the plurality of customer devices and/or on the plurality of merchant devices.

One of the merchant devices may transmit a selectable reward option to the platform. The transmission may be processed in real-time. The transmission may be processed using a batch mode processing. The virtual display may be configured to display the transmitted reward option.

The virtual display, displaying the transmitted reward option, may be displayable on the plurality of customer devices and/or on the plurality of merchant devices. One of the customer devices may receive a selection of the transmitted reward option. Upon receiving the selection, the customer device may store the selected reward option.

At a point of sale, when the customer device is used to finalize a purchase associated with the selected reward option, the customer device may be configured to communicate with the point-of-sale. The communication may include termination of a custom communication exchange. A custom communication exchange may include communication between a customer device, a merchant, an acquirer and an issuer. The customer device communicates with a merchant. The merchant then communicates with an acquirer, which in turn communicates with an issuer. Intermediaries may facilitate the communication between the merchant and the issuer. Upon receipt of approval by the issuer, the issuer communicates the approval to the acquirer, and the acquirer communicates the approval back to the merchant. The communication may include generation of an updated custom communication exchange. The communication may include information about interchange or other transaction economics as well as rewards information, transaction information, accrued benefits overall (total points displayed on the receipt), etc.

In some embodiments, the updated custom communication exchange may be transmitted from the point of sale directly to an issuer. It should be appreciated that, in these embodiments, an acquirer and/or network is removed from the communication exchange and/or the acquirer is replaced with a combined acquirer/issuer. In other embodiments, the updated custom communication exchange may be transmitted from the point of sale to an issuer, via an acquirer.

The updated custom communication exchange may include an updated interchange rate passed on to the merchant by the acquirer. The updated interchange rate may be passed on, by the acquirer, to a merchant associated with the point of sale device. The updated interchange rate may be less than an interchange rate included in the custom communication exchange. The updated custom communication exchange may include other updated fees that a merchant may pay, such as updated network fees or updated acquirer fees, associated with the processing of a transaction.

The updated custom communication exchange may include a purchase price associated with the purchase. The purchase price may be less than a purchase price included in the custom communication exchange. In some embodiments, the selected reward option may be a non-monetary reward. The non-monetary reward may include a free item, a free service and/or a free upgrade. The non-monetary reward may grant the customer access to exclusive products and/or services not available to the general public. The non-monetary reward may include enabling one or more purchases at a preferred shopping time. The non-monetary reward may include any other suitable non-monetary reward. In these embodiments, the purchase price may equal to a purchase price include in the custom communication exchange. Therefore, in order to communicate the selected reward option to the issuer, a selected reward option complete tag may be associated with the updated custom communication exchange.

The updated custom communication exchange may include a reward tag. The reward tag may be associated with the purchase of the item. The reward tag may be reset to zero from a non-zero value included in the custom communication exchange. The zero value may be used as to trigger removal of the purchase from a points eligibility list.

The updated custom communication exchange and/or the custom communication exchange may include interchange information, other economic information, reward information, transaction information, accrued benefits total and any other suitable information. In some embodiments, the accrued benefits total or total points accrued for a specific card product may be displayed on a receipt on the customer.

The platform may be configured so that each merchant device may update offers, transmit additional offers and/or remove offers in real-time.

In some embodiments, the plurality of customer devices may be a first plurality of customer devices. The first plurality of customer devices may be a second plurality of customer devices. A customer device included in the first plurality of customer devices may be configured to share at least one selectable reward option with a subset of the second plurality of customer devices. The subset may be a predefined subset. The subset may be distinct for each customer device. The subset may be defined by the customer device.

The customer devices included in the subset may be configured to receive "like" and/or "dislike" comments to shared reward offers. The like and/or dislike comments may be displayed on the virtual display of the customer devices included in the subset. The customer devices included in the subset may be configured to receive a selection of the shared offers.

A method for rerouting a communication from a first network to a second network is provided. The first network may include a merchant. The merchant may be in communication with an acquirer. The acquirer may be in communication with an issuer. The second network may include at least one merchant. The merchant may be in direct communication with the issuer independent of communication with an acquirer. The second network may include one or more intermediaries to facilitate the communication.

The method may include receiving a selectable reward option at an offer platform. The reward option may be received from a merchant device. The merchant device may be included in a plurality of merchant devices.

The method may include displaying the reward option on a virtual display. The virtual display may be displayable on the plurality of merchant devices and on the plurality of customer devices. The method may include receiving a selection of a selectable reward option from a customer device. The method may include storing the selected reward option on the customer device. The method may include storing the selected reward option on the offer platform.

The method may include receiving a request for a purchase communication at a point of sale associated with the merchant. The purchase communication may be associated with the selected reward option. Upon receipt of the request, a rerouting of the purchase communication via the second network may be triggered. The method may include transmitting the purchase communication directly from the merchant to the issuer via the second network. It should be appreciated that the interchange rate charged for use of the second network may be less than an interchange rate charged for use of the first network. In addition to interchange reductions, other economic incentives may be applied. The other economic incentives may include reduced network fees and/or reduced acquiring fees. Such fee reductions could be reduced to compensate the merchant for providing customers with custom reward programs.

In some embodiments, each selectable reward option may include a reward metadata file. The reward metadata file may include information such as geographic location information, target age information, market data, target income bracket and/or any other suitable information. In these embodiments, each customer device may include a dynamic customer metadata file. The dynamic customer metadata file may include information such as current geographic location information, age information, spend trends and analysis, income information, social media data and/or any other suitable information. The dynamic customer metadata file may be updated when a customer enters a predetermined location. The location may be a shopping center. A customer associated with the customer device may enable and/or disable the updating of the dynamic customer metadata file.

A processor may determine which reward options are relevant for which customer devices based on a correlation value between the dynamic customer metadata file and the reward metadata file being greater than a predetermined correlation value. The display of each customer device may be configured to display the reward options that are determined to be relevant.

A system for offering rewards is provided. A reward may be provided by a merchant. The merchant may offer rewards based on location. A merchant may offer rewards that are specific to customer behavior. Such customer behavior may include geolocation, spend analysis, market data and social media data. Merchant may also create rewards that promote specific customer behavior. Such specific customer behavior may include online pre-ordering of services and/or products. Such specific customer behavior may include purchasing specific items.

Merchants may use the merchant-funded reward to steer or direct a desired customer behavior. For example, a merchant may provide a reward only if a customer uses a self-service check-out kiosk. A merchant may provide a reward only if a customer orders ahead with his/her mobile device. A merchant may provide a reward only if a customer shops within a desired department within a shop. A merchant may provide a reward only if a customer shops at a specific merchant location. A merchant may modify rewards in order to promote specific customer behavior at different locations, different seasons, various times of day or any other reason.

A new card product may offer merchant-funded rewards and reduced interchange. This may be the exclusive reward associated with this card. This card may be promoted by merchants because the card carries lower costs of acceptance. In some embodiments, custom rewards can be used to enhance an already existing card product offered by an issuer. For example, card products offered by the merchant may be eligible for opting into a custom rewards program or retaining an association with other rewards programs. In such embodiments, the other rewards programs may be the default rewards programs associated with the card product. In other embodiments, custom rewards may be the default rewards program and customer may opt-out of custom rewards and opt into another rewards program. In other embodiments, custom rewards may be the exclusive rewards program for a card product.

A custom rewards network may be used to handle custom reward products, such as the new card product. The network may impose lower interchange rates for cards associated with merchant-funded rewards. Using the network, interchange, network and/or acquirer fees may be further lowered by avoiding traditional network fees. Customers may opt-in to merchant-funded rewards. Upon customer opt-in, a shift may be triggered to the custom rewards network. Rewards may be offered at the point of sale. If a customer accepts, the transaction may be rerouted to the custom rewards network.

A social media platform may be created around the custom rewards network and/or card product. Cardholders may be able to share offers, receive offers and like and/or dislike offers on the social medial platform. It should be appreciated that the social media platform may extend to non-cardholders as well. Cardholders may be able to share offers with non-cardholders. This may encourage the non-card holders to apply for the new card.

A real-time market may be instantiated. The real-time market may enable merchants to offer customers a variety of reward choices. Customers may select rewards that meet their respective needs. Merchants may be able to view competitor's reward bids. The marketplace may create real-time competition for cardholder business.

The apparatus may include, and the methods may involve, one or more than one machine-readable medium storing program code comprising machine-readable instructions. The instructions, when executed by one or more than one processor, may instruct the processor to perform one or more than one method. The method(s) may be for dynamically incentivizing use of one or more payment instruments.

The methods may include, and the apparatus may involve, a method for dynamically incentivizing use of one or more than one payment instrument by one or more than one customer on one or more than one purchase from one or more than one merchant.

The method may include providing an electronic platform for enabling one or more customer reward options. The reward options may include one or more than one standard reward option. The standard reward option may be associated with a first interchange fee upon the acquirer. The standard reward option may be associated with a first cost of acceptance upon the merchant. The standard reward option may be appraised at a first value to the customer.

The reward options may include one or more than one custom reward option. The custom reward option may be funded by the merchant. The custom reward option may be assessed by the merchant to be of a second value to the customer. The second value may be greater than the first value.

The method may include imposition of the first interchange fee. The first interchange fee may be imposed upon the acquirer. The method may include imposition of the first cost of acceptance. The first cost of acceptance may be imposed upon the merchant. The imposition of the first interchange fee and/or of the first cost of acceptance may be dependent upon determining that the standard reward option has been selected by the customer.

The method may include imposition of a second interchange fee. The second interchange fee may be imposed upon the acquirer. The method may include imposition of a second cost of acceptance. The second cost of acceptance may be imposed upon the merchant. The second interchange fee may be of an amount less than the first interchange fee. The second cost of acceptance may be of an amount less than the first cost of acceptance. The imposition of the second interchange fee may be dependent upon determining that the custom reward option has been selected by the customer.

The purchase may include one or more than one product. The purchase may include one or more than one service. The custom reward option(s) may include one or more than one upgraded form of the product(s). The custom reward option(s) may include one or more than one upgraded form of the service(s). The custom reward option may include one or more than one discount. The custom reward option may include one or more than one exclusive purchase time-window. The custom reward option may include one or more than one preferred purchase time-window.

The method may include providing a real-time, dynamic offer platform. The providing may be via one or more customer devices. The providing may be via one or more point-of-sale (POS) merchant devices. The platform may include one or more than one real-time, dynamic offer interface. The interface may include one or more than one virtual display. The virtual display(s) may be displayable on the customer device(s). The virtual display(s) may be displayable on the POS merchant device(s).

The method may include causing the POS merchant device(s) to perform one or more than one transmission of one or more than one selectable reward option. The transmission may be executed in real-time. The transmission may be executed via the platform. The transmission may be to the customer device(s).

The method may include causing the customer device(s) to perform one or more than one presentation of the transmitted reward option(s). The presentation(s) may be upon the transmission(s) of the reward option(s). The presentation(s) may be via the virtual display(s)

The method may include enabling the customer device(s) for receipt of one or more than one selection of the presented reward option. The receipt may be mediated via the virtual display. The selection(s) may be mediated by the virtual display.

The method may include causing the customer device to perform one or more than one storing of the selected reward option. The storing may be executed upon the receipt of the selection.

The method may include causing the customer device to communicate with the POS merchant device upon a use of the customer device to finalize a purchase associated with the selected reward option. The communication may include the termination of the custom communication exchange. The communication may include the generation of the updated custom communication exchange.

The apparatus may include, and the methods may involve, a smart reward system for dynamically incentivizing use of a payment instrument by a customer on a purchase from a merchant. The payment instrument may be associated with an account of the customer.

The system may include one or more than one receiver. The receiver(s) may include software and/or hardware configured to receive account information from the payment instrument. The account information may indicate the account. The account information may include identifying, authenticating and/or authorization data.

The system may include one or more than one electronic communication network device. The network device(s) may facilitate wired and/or wireless communication over one or more than one network, such as the internet. The communication may be secured and/or encrypted.

The system may include one or more than one processor. The processor(s) may be electronically connected to the network device(s). The processor(s) may control the network device(s).

The system may include one or more than one electronic display. The display(s) may be controlled by the processor(s). The display(s) may be configured to present data visually and/or auditorily. The display may include speaker(s) and/or light emitting diode (LED) arrays. The LED arrays may include organic light-emitting diodes (OLEDs).

The system may include one or more non-transitory computer-readable media. The media may be electronically connected to the at least one processor. The media may store machine-readable instructions for instructing the processor(s) to perform one or more of the steps of the aforementioned methods.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1B:
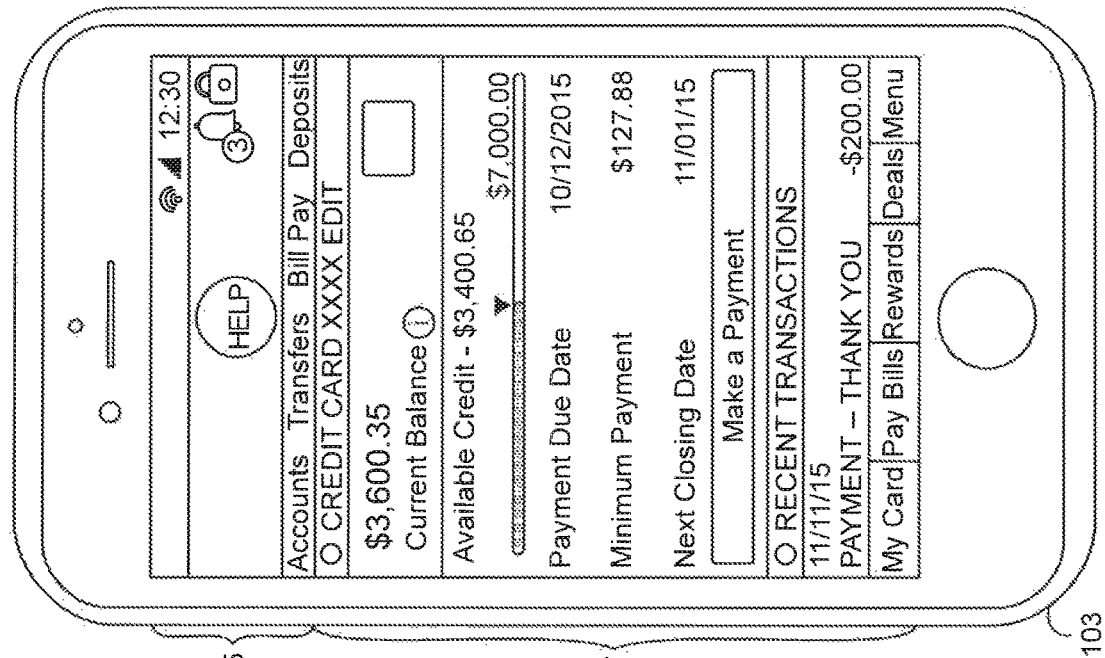
FIG. 1B shows views of an illustrative device presenting illustrative screenshots in accordance with principles of the invention.
Figure 1B:
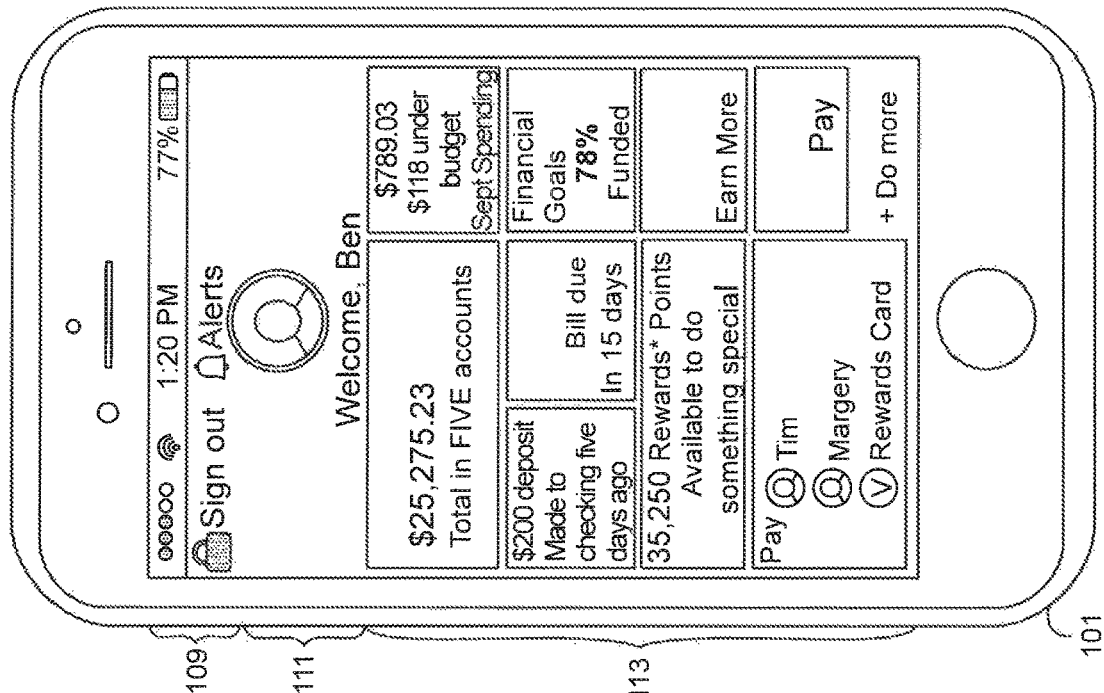

FIG. 1B shows an illustrative device presenting an illustrative offer platform. The offer platform may include one or more than one user interface, such as graphic user interface (GUI) 101 and/or GUI 103.

GUI 101 and/or GUI 103 may include one or more platform features. The platform features may include one or more "widgets", windows, virtual tabs, virtual buttons and/or virtual toggle switches.

GUI 101 may include a dashboard view. GUI 101 may include a welcome screen. GUI 101 may include features 109, features 111, and/or features 113.

Features 109 may enable logging into or out of one or more than one platform account. Features 109 may enable accessing of platform information, such as account alerts and/or notifications. Features 109 may enable accessing support and/or help information.

Features 111 may include the welcome screen. Features 111 may include one or more indications identifying the account(s). Features 111 may include photo(s) of one or more than one user associated with the account(s). Features 111 may include a name(s) and/or username(s) of the user(s).

Features 113 may present general account information associated with the account(s). Features 113 may facilitate accessing the account(s). Features 113 may facilitate transaction(s) with one or more third parties. Features 113 may facilitate accessing of GUI 103.

GUI 103 may include an account screen. GUI 103 may include detailed information associated with one or more of the account(s). GUI 103 may include features 115 and/or features 117. Features 115 may enable logging into or out of the account(s). Features 115 may enable accessing of additional account information, such as account alerts and/or notifications. Features 115 may enable accessing support, customer service and/or help information.

Features 117 may include detailed account data, such as account history and/or upcoming account events. Features 117 may facilitate making one or more payments to the account and/or updating account information. Features 117 may facilitate accessing of GUI 101.

Figure 1C:
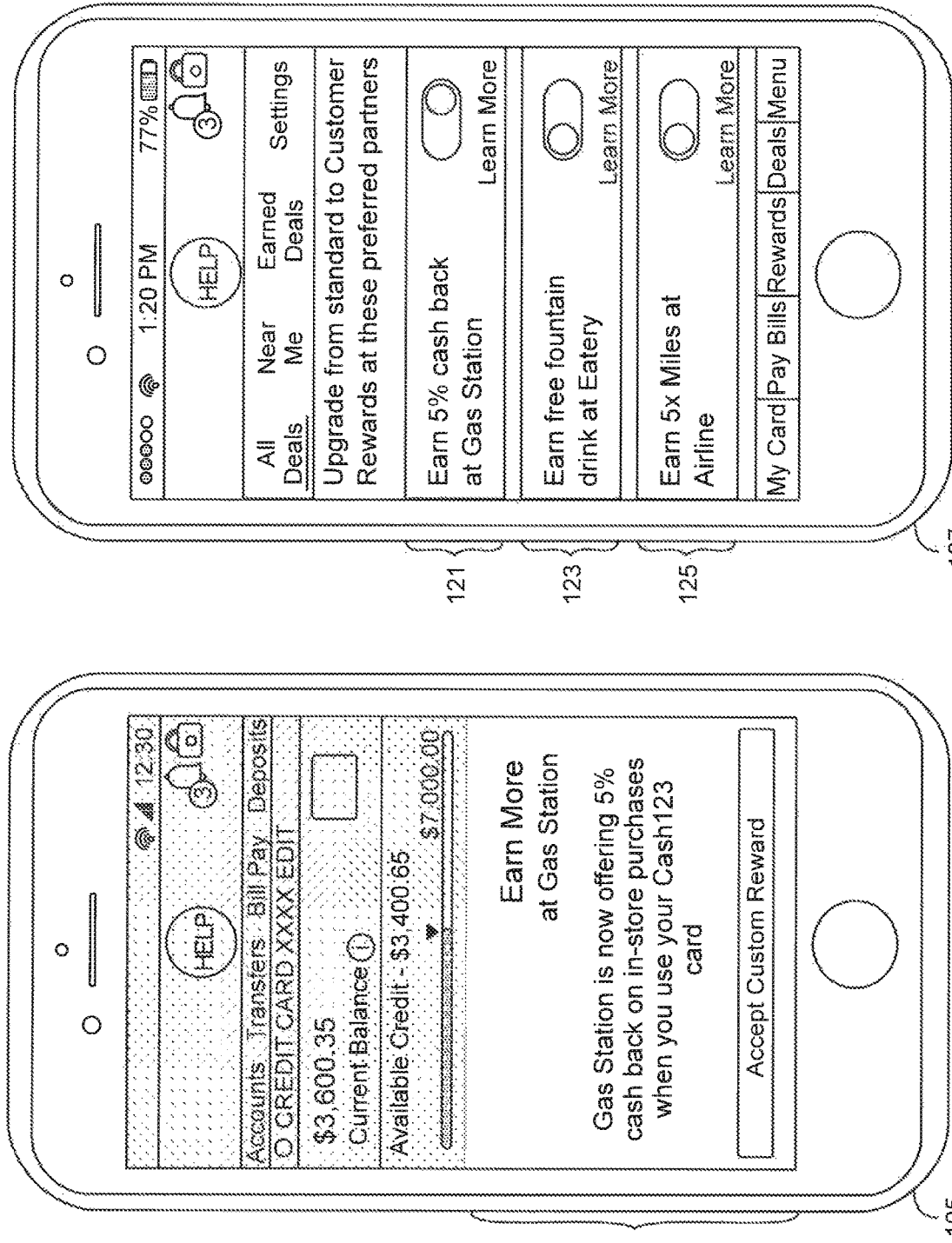
FIG. 1C shows views of the illustrative device, shown in FIG. 1B, presenting additional illustrative screenshots in accordance with principles of the invention.

FIG. 1C shows the device presenting an illustrative custom offer platform. The custom offer platform may include one or more than one user interface, such as GUI 105 and/or GUI 107. GUI 105 and/or GUI 107 may include one or more of the platform features described in connection with FIG. 1B.

GUI 105 may include one or more than one of the features described in connection with GUIs 101 and 103. GUI 105 may include proactive "shadow box" 119. Shadow box 119 may include one or more than one pop up window. Shadow box 119 may present one or more than one custom merchant reward offer associated with one or more than one payment instrument. Shadow box 119 may include general and/or detailed information regarding the offer(s). Shadow box 119 may include one or more than one of the features configured to facilitate accepting and/or registering for the offer(s).

Shadow box 119 may be configured to be presented in response to a triggering event. The event may include detected proximity of the user to a geographic location. The location may be associated with the offer, such as a location of a merchant presenting the offer. The event may include a detected purchase by the user associated with the offer, such as a purchase of a similar or related product and/or service. Presentation of shadow box 119 may be over GUI 103. The event may include activation of one or more of the features of GUI 101, GUI 103 and/or GUI 107.

Upon presentation of GUI 105, shadow box 119 may occlude one or more than one portion of GUI 103. Upon presentation of GUI 105, one or more than one remaining portion of GUI 103 may be shaded and/or inaccessible until removal of shadow box 119.

GUI 107 may include a customer rewards screen. GUI 107 may include some or all of the features described in connection with GUIs 101, 103 and 105. GUI 107 may present general information regarding one or more reward offers. For example, GUI 107 may include a "learn more" link that links the user to and/or navigates the user to a merchant website, application or other applicable medium where the merchant promotes the merchant brand, message, and/or reward value. GUI 107 may include one or more features for accepting and/or rejecting the offers, such as features 121, 123 and 125.

Figure 2:
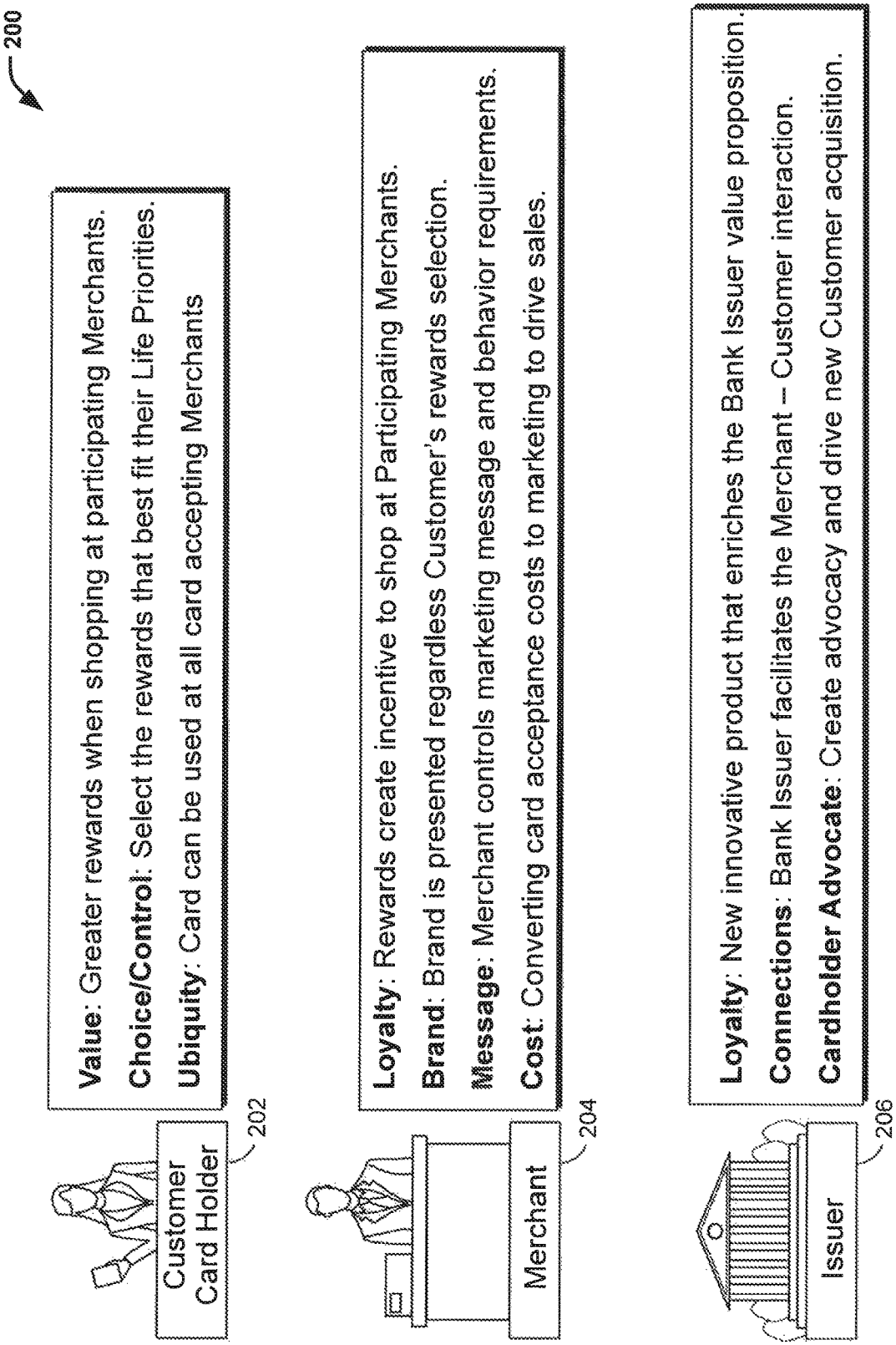
FIG. 2 shows an illustrative flow chart in accordance with principles of the invention.

FIG. 2 shows illustrative chart 200. Chart 200 shows values possessed by customer 202, merchant 204 and bank issuer 206 when integrating the merchant-funded rewards program into a pre-existing payment instrument. Customer 202, merchant 204 and bank issuer 206 may all benefit from having a capability of switching communication exchange routes within a pre-existing payment instrument.

When using the merchant-funded rewards program, customer 202 may receive rewards that are greater in value than the standard rewards. Customer 202 may select a reward that best fit their life priorities. Customer 202 may use the payment instrument at all merchants that accept the payment instrument.

Merchant 204 may benefit from participating in the merchant-funded rewards program. Providing merchant-based rewards may incentivize the customer to shop at participating merchants. Offering rewards and displaying the rewards in real-time to the customer may market the merchants brand regardless of whether the customer opts-in to the merchant-funded rewards program. In a merchant-funded rewards program architecture, merchant 204 may control its marketing message and behavior requirements. Merchant 204 may convert the card acceptance costs to marketing in order to drive sales.

Bank issuer 206 may benefit from participating in the merchant-funded rewards program. Bank issuer 206 may not lose out by participating with the merchant-funded rewards program. New innovative products of a merchant may enrich the bank issuer value proposition. Bank issuer 206 may gain from the direct interaction between the merchant and the issuer, thereby increasing sales while using a specific issuer-based card product. Bank issuer 206 may facilitate the merchant-customer interaction. Bank issuer 206 may create advocacy and drive new customer acquisition.

Figure 3:
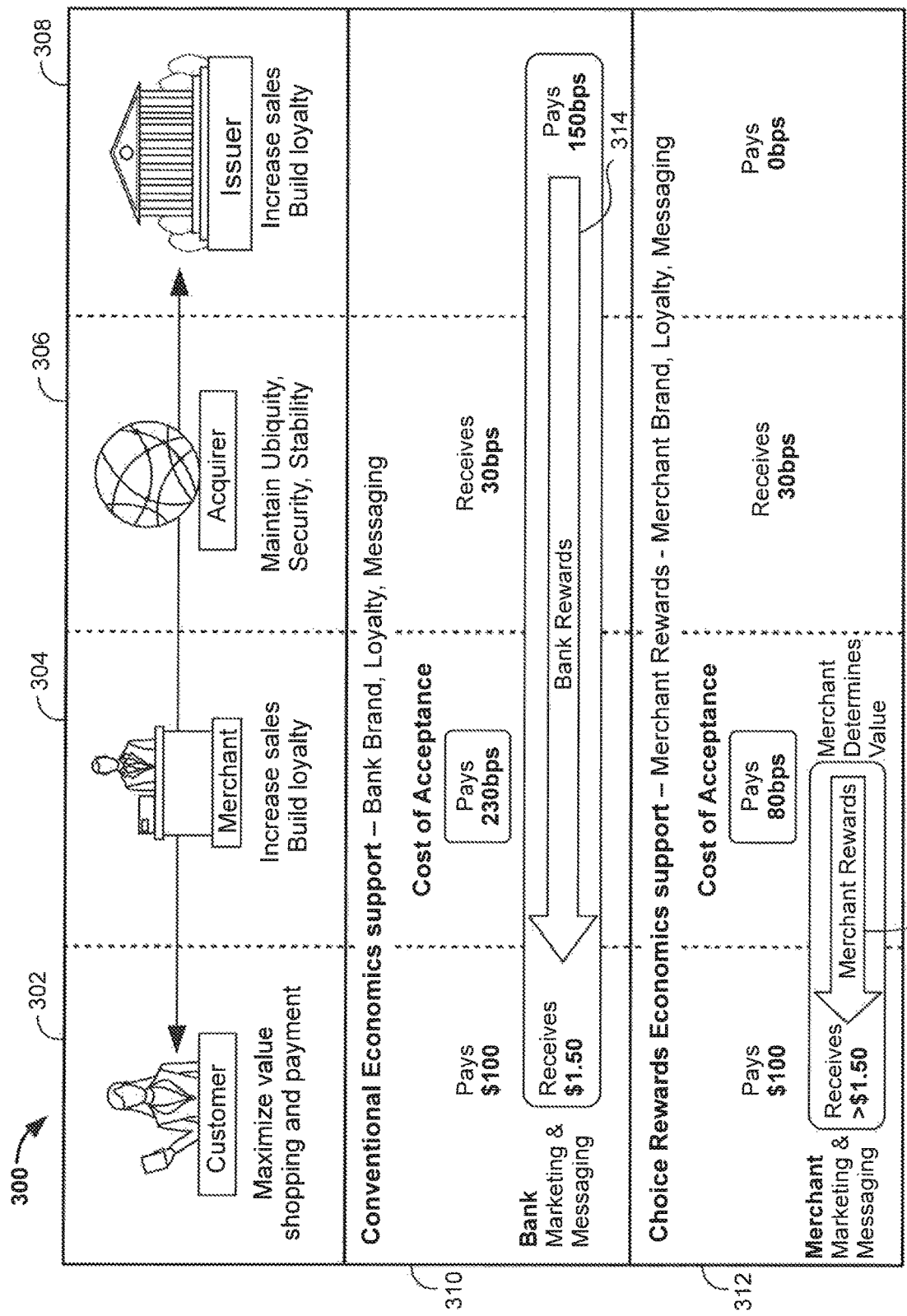
FIG. 3 shows an illustrative flow diagram in accordance with principles of the invention.

FIG. 3 shows illustrative pictorial diagram 300. Diagram 300 shows values paid and received by a customer, a merchant, an acquirer and/or a network and an issuer when using an offer platform. Vertical column 302 of diagram 300 presents values paid and received by the customer. The customer may seek to maximize value in his or her shopping and payments. Column 304 presents values paid by the merchant. The merchant may seek to increase sales and build loyalty. Column 306 presents values netted by the acquirer/network. The acquirer/network may maintain security, stability, and ubiquity of credit transactions. Column 308 presents values paid by the issuer. The issuer may seek to increase sales and build brand loyalty.

In diagram 300, horizontal row 310 presents values associated with a credit transaction using a conventional reward architecture. The conventional reward architecture may be funded by the issuer. The economics of the conventional reward architecture may support issuer branding, customer loyalty, and messaging to a customer base of the issuer.

Horizontal row 312 of diagram 300 presents values associated with a credit transaction using a merchant-funded reward architecture. The economics of the merchant-funded reward architecture may support merchant branding, customer loyalty, and messaging to a merchant customer base. The following paragraphs describe the reward architectures shown in each row.

The current paragraph describes the conventional reward architecture shown in row 310. The customer in column 302 may link a payment instrument to a POS terminal to initiate a purchase. The purchase price may be $100. The cost of acceptance of the credit transaction may be the transaction cost incurred by the merchant. The cost of acceptance is represented in column 304. In the example shown, the merchant may pay 230 basis points (bps). One bps corresponds to 0.01 of a percent. In the example shown, the merchant may pay $2.30 as a transaction cost. 30 bps from the transaction cost, or $0.30, is ultimately netted by the acquirer, as shown in column 306. The acquirer may pay a fee of 200 bps, or $2.00, to the issuer. 150 bps, or $1.50, is paid by the issuer as bank reward 314, as shown in column 308. Reward 314 is received by the customer, as shown in column 302.

The current paragraph describes the merchant-funded reward architecture shown in row 312. The customer in column 302 may link a payment instrument to a POS terminal to initiate a purchase. The purchase price may be $100. The cost of acceptance of the credit transaction may be the transaction cost incurred by the merchant. The cost of acceptance is represented in column 304. In the example shown, the merchant may pay 80 bps, or $0.80, as the transaction cost. 30 bps, or $0.30, from the transaction cost in the example of row 312, is ultimately netted by the acquirer/network, shown in column 306. The acquirer may pay the issuer a fee of 50 bps, or $0.50. In the reward architecture shown in row 312, the issuer does not pay any value in rewards, so the net value received by the issuer in row 312 may be the same as the net value received by the issuer in row 310 (50 bps). The merchant, shown in column 304, may pay merchant reward 316 directly to the customer. Reward 316 may be designed so that a cost of reward 316 to the merchant is less than a value of reward 316 to the customer. In the exemplary transaction of row 312, the merchant may offer a reward that costs less than $1.50, yet is valued by the customer at a value greater than $1.50. The total transaction cost to the merchant is then less than the $2.30 transaction cost of row 310. Furthermore, reward 316 received by the customer, as shown in column 302, may be greater in row 312 than the $1.50 received in row 310.

Figure 4:
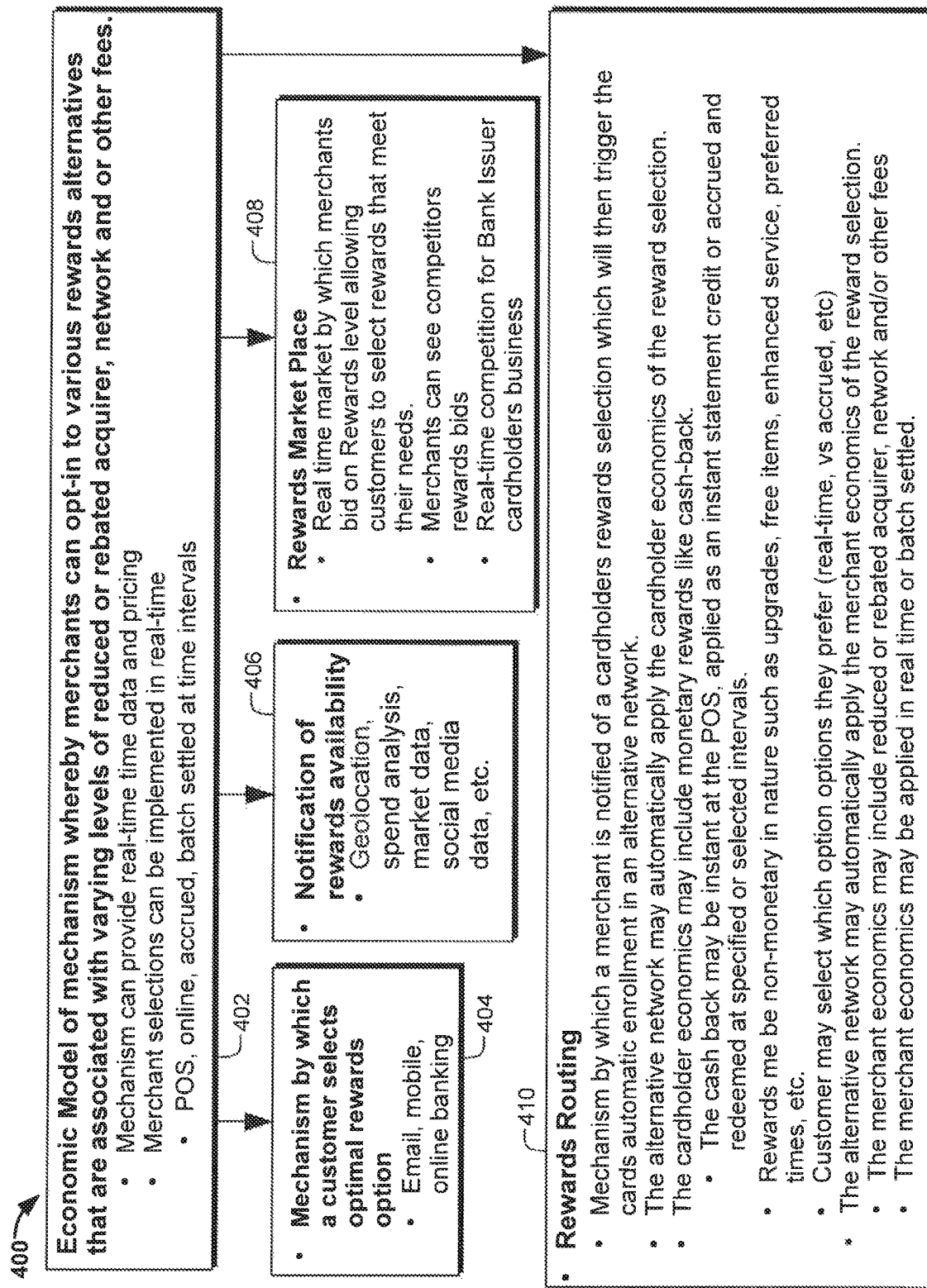
FIG. 4 shows an illustrative outline in accordance with principles of the invention.

FIG. 4 shows an illustrative outline 400 presenting various models which can be used with the merchant-funded rewards offer platform. At 402, a high-level description of the various rewards alternatives used in connection with a pre-existing payment instrument is portrayed. Merchant-funded rewards architecture may be a mechanism whereby merchants can opt-in to various rewards alternatives that are associated with varying levels of reduced acquiring, network and/or interchange fees. Mechanism may provide real-time data and pricing. Merchant selections may be implemented in real-time. They may be implemented at a POS terminal. They may be implemented online. They may be accrued and/or batch settled at time intervals.

At 404, mechanisms by which a customer may select optimal rewards options is described. A customer may select reward options via email, mobile and/or online banking.

At 406, notification-types of the rewards availability is described. The notification-types may be geolocation, spend analysis, market data and or social media data.

At 408, a rewards market place is described. The rewards market place may be a real-time market by which merchants may bid on a rewards level. The rewards level may enable customers to select rewards that meet their needs and/or standards. Rewards market place enables merchants to see competitor's rewards bids. Rewards market place may enable real-time competition for bank issuer cardholders' business.

At 410, mechanisms for routing of the rewards is described. When a merchant is notified of a cardholder's rewards selection, the cards automatic enrollment in an alternative network may be triggered. The alternative network may automatically apply the cardholder economics of the reward selection.

The cardholder economics may include monetary rewards. The monetary rewards may include cash-back rewards. The cash back may be instant at the POS. The cash back may be applied as an instant statement credit or accrued and redeemed at specified and/or selected intervals.

Rewards may be non-monetary in nature. The rewards may include upgrades, free items, enhanced service and/or preferred service times.

Customers may be enabled to select which options they prefer. The options may include real-time or accrued.

The alternative network may further include automatically applying economics of the reward selection. The economics may include reduced acquirer, network and/or interchange fees. The economics may be applied in real-time or may be batch settled.

Figure 5:
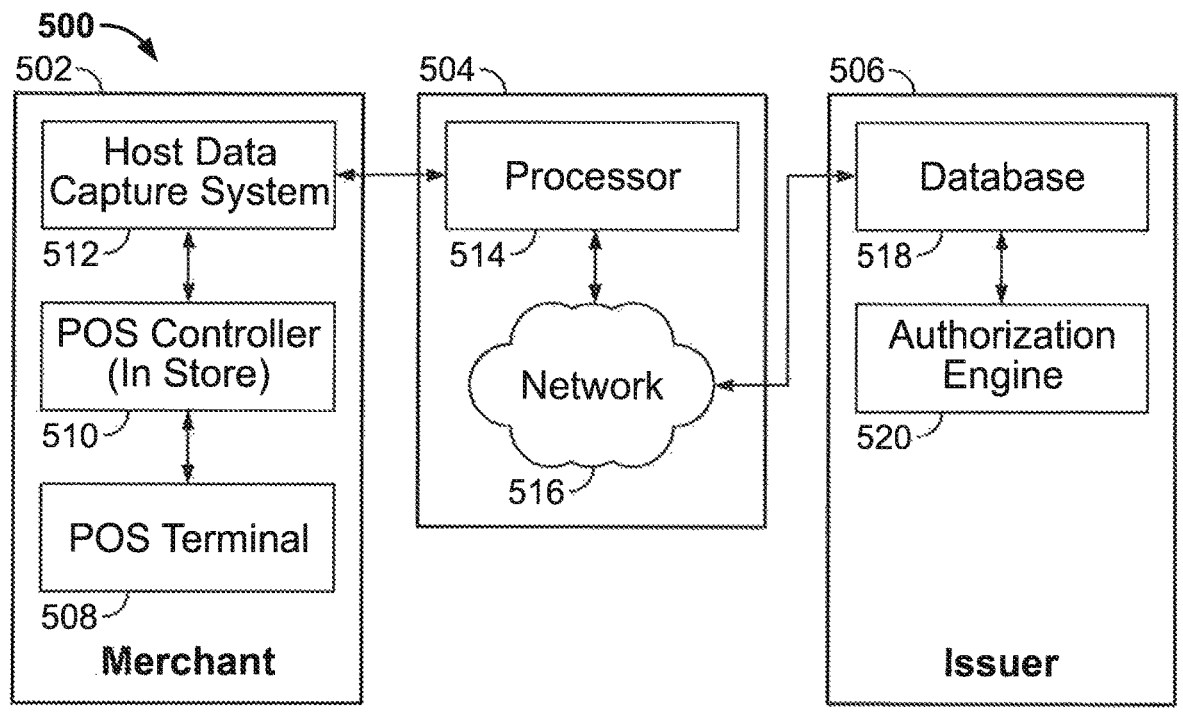
FIG. 5 shows an illustrative system in accordance with principles of the invention.

FIG. 5 shows illustrative system 500 for processing and communicating transaction cost information. System 500 may include merchant component 502, network component 504 and issuer component 506. In general, a system such as 500 may include many merchant components such as 502, many issuer components such as 506 and many network components such as 504.

A customer may purchase goods by transferring customer information from a personal data storage device, such as a credit card, to point of sale ("POS") terminal 508. POS terminal 508 may read the customer information from the card. The card may store data in a magnetic strip, a bar code, a silicon chip or any other suitable data storage device or format.

The customer information may include issuer information, account information and any other suitable information.

POS terminal 508 may transmit transaction information to POS controller 510. The transaction information may include some or all of the customer information and any other suitable information, such as the transaction amount, information regarding the purchased goods and one or more values associated with the transaction.

POS controller 510 may act as a server for providing user prompts and display layout information to one or more POS terminals such as POS terminal 508. POS controller 510 may receive transaction information from one or more of the POS terminals.

POS controller 510 may transmit transaction information to host data capture system 512. Host data capture system 512 may store transaction information from POS controller 510. Host data capture system 512 may store accounting data, inventory data and other suitable data that may be included in the transaction information.

The transaction information may include information about the merchant, the merchant's business, the merchant's network membership, the merchant's business behavior and any other suitable information. Transaction information may include some or all of the information that is necessary to identify reward eligibility. Rewards eligibility may depend on factors, such as customer spend rate, purchasing behavior, time/date, geolocation, interchange rate, network rates, merchant type, merchant size, transaction processing method, and any other suitable factors. Transaction information may include one or more of the foregoing factors and any other suitable factors.

The transaction information may be stored in any suitable element of merchant component 502, network component 504 and issuer component 506. For example, transaction cost information may be stored in processor 514. Processor 514 may include algorithms that may be used in conjunction with the transaction cost information to identify a custom reward for a customer transaction taking place at POS terminal 508.

For example, the merchant may offer different rewards to different customers. Offered rewards may depend of what the customer typically purchases (at the merchant or other merchants). After a reward is identified, processor 514 may transmit the reward, via merchant components 502, to POS controller 510.

Host data capture system 512 may be configured to determine eligibility for a reward or rewards program. Host data capture system 512 may track earning and spending of rewards associated with a payment instrument. POS controller 510 may be configured to determine eligibility for a rewards program and/or the earning or spending of rewards.

POS terminal 508 may have one or more interactive features that the customer may use. The features may provide the customer with information that may help the customer decide whether to execute the transaction. The customer may use the features to obtain more information about the merchant, the transaction, a reward, a rewards program, costs associated with different payment instruments, or any other suitable information.

Host data capture system 512 may route the transaction record to processor 514. The illustrative systems shown in FIGS. 5 and 6 may include one or more other processors that perform tasks that are appropriate for the components thereof.

Processor 514 may route the transaction record, via network 516, to database 518. Network 516 may be a default transaction processing network. Network 516 may be a bypass transaction processing network. The routing may be governed by the transaction information or rewards eligibility. For example, eligibility for a rewards program may be associated with a bank issuer number ("BIN") that is encoded in the customer's payment instrument. Authorization engine 520 may render a transaction authorization decision based on the transaction information.

Authorization engine 520 may transmit authorization information back to POS terminal 508 through network 516, processor 514, host data capture system 512 and POS controller 510. The authorization information may include the authorization decision (e.g., "GRANTED" or "DENIED"). The authorization information may include some or all of the transaction information or rewards information (e.g., specific rewards, eligibility or rewards accrued). The transaction information may be used by processor 514 to route the authorization information back to the merchant and the POS terminal where the customer is present.

Figure 6:
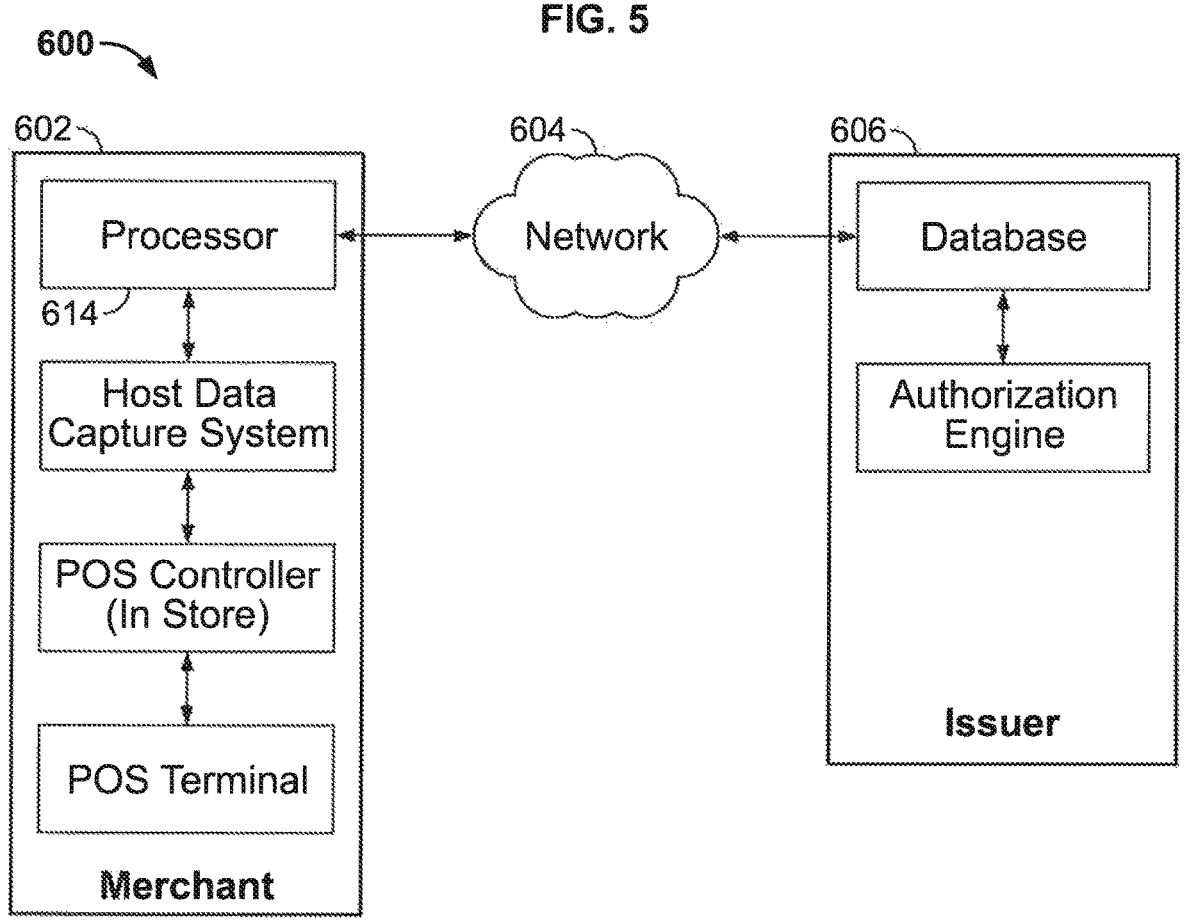
FIG. 6 shows another illustrative system in accordance with principles of the invention.

FIG. 6 shows illustrative system 600 for processing and communicating payment instrument and transaction information. System 600 may include merchant component 602, network component 604 and issuer component 606. In general, a system such as 600 may include many merchant components such as 602 and many issuer components such as 606. System 600 may have one or more of the features that are described herein in connection with system 500.

In system 600, processor 614 may be present in merchant component 602. Corresponding processor 514 is present in network component 504 (shown in FIG. 5). Processes in accordance with the principles of the invention may include one or more features of the process illustrated in FIGS. 5-6.

Figure 7A:
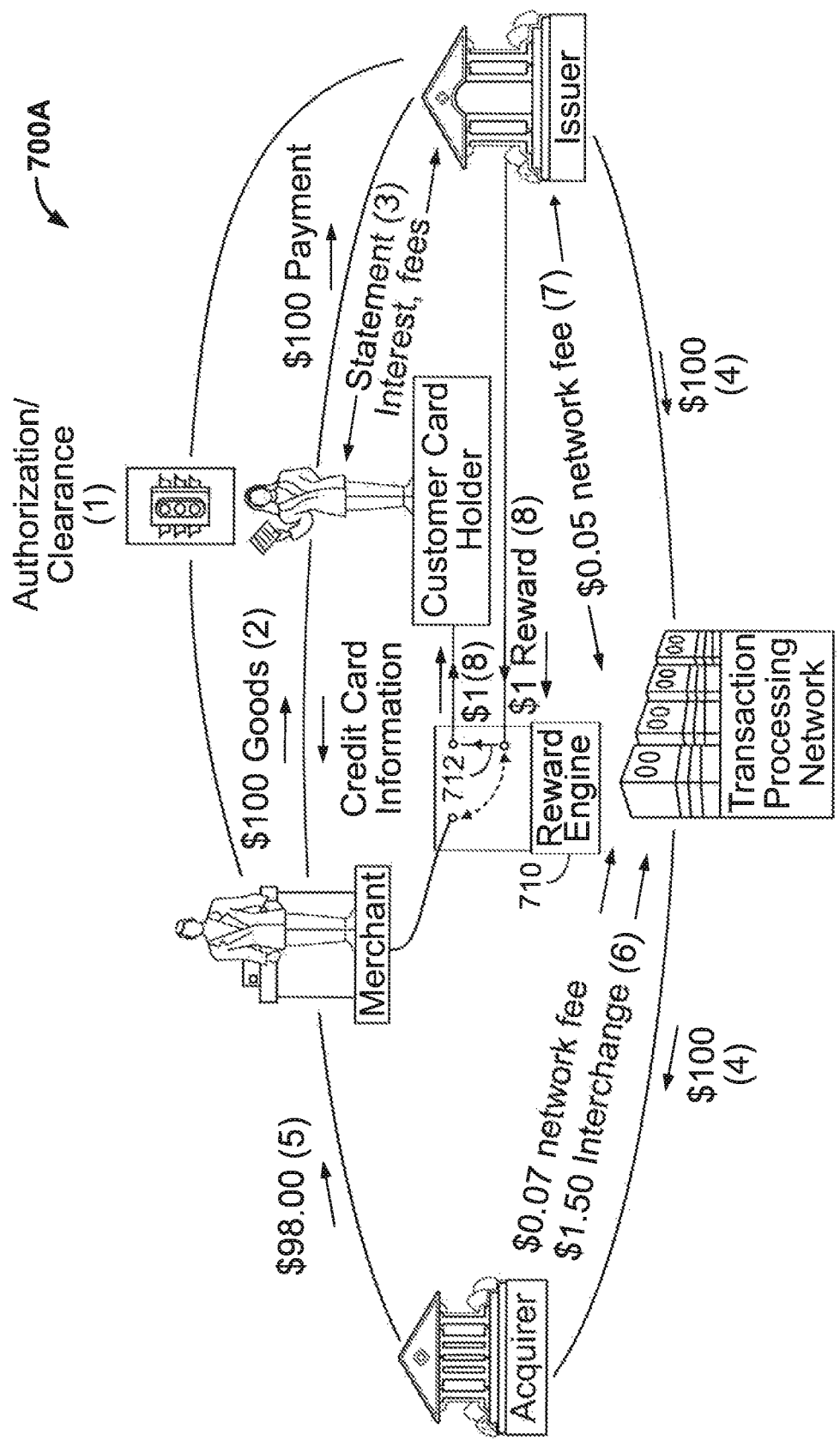
FIG. 7A shows a first orientation of an illustrative system architecture in accordance with principles of the invention.

FIG. 7A shows credit card transaction settlement flow 700A. Flow 700A may include features and steps of flow 100 (shown in FIG. 1). For example, flow 700A may involve the transaction participants, such as the merchant, the customer, and the transaction service providers, that are identified above.

At step 1 of FIG. 7A, the merchant provides information, relating to a proposed transaction between the merchant and a customer, to a transaction authorization and clearance provider. The information may include reward data, such as whether the merchant and/or customer have registered for a custom reward program. The transaction authorization and clearance provider may be a transaction processing network. The transaction authorization and clearance provider may provide transaction authorization and clearance information to the merchant. The transaction authorization and clearance information may include authorization for the transaction to proceed.

At step 2 of FIG. 7A, the merchant provides $100 in product to the customer. The customer pays with a credit card.

At step 3 of FIG. 7A, the issuer transmits to the customer a statement showing the purchase price ($100.00) due. The issuer collects the purchase price amount, along with interest and fees if appropriate, from the customer.

At step 4 of FIG. 7A, the issuer routes the purchase price amount ($100.00) through the transaction processing network to the acquirer.

At step 5 of FIG. 7A, the acquirer partially reimburses the merchant for the purchase price amount. In the example shown in FIG. 7A, the partial reimbursement is $98.00. The difference between the reimbursement amount ($98.00) and the purchase price amount ($100.00) is a two-dollar ($2.00) transaction cost.

At step 6 of FIG. 7A, the acquirer pays an interchange amount ($1.50), via the transaction processing network, to the issuer.

At step 7 of FIG. 7A, both the acquirer and the issuer pay a transaction processing network fee ($0.07 for acquirer and $0.05 for the issuer) to the transaction processing network.

At step 8 of FIG. 7A, the issuer pays a reward ($1.00) to the customer. The reward may be routed through custom reward engine 710. Reward engine 710 may include hardware and/or software configured to receive the reward data. Reward engine 710 may include and/or involve some or all of the features and/or steps described in connection with FIGS. 1-6, such as of authorization engine 520. Reward engine 710 may include reward path 712. Reward path 712 may be directed from one or more of the transaction participants to the customer. Based on the reward data, reward engine 710 may determine an orientation of reward path 712. For example, upon determining that the customer and/or merchant have opted out of the custom reward program, reward path 712 may be directed to transmit the reward from the issuer to the customer. In the orientation shown in FIG. 7A, the issuer pays the reward to the customer. Illustrative net positions are shown below in Table 3.

TABLE 3

Net positions, by participant, based on settlement flow 700A (shown in FIG. 7A).

| Participant | Net ($) |
|---|---|
| Issuer | 0.45 |
| Acquirer | 0.43 |
| Transaction processing network | 0.12 |
| Merchant | −2.00 |
| Customer | 1.00 |

In settlement 700A (shown in FIG. 7A), the transaction fee is based on an exemplary merchant discount rate of 2%. The $1.50 interchange is based on an exemplary interchange rate of 1.5%. The sum of the transaction processing network fees ($0.07 and $0.05) is based on a total exemplary transaction processing network fee rate of 0.12%. Reward engine 710 may be configured to enable one or more of other transaction participants, such as the acquirer and/or the transaction processing network, to provide some or all of the reward (not shown).

Figure 7B:
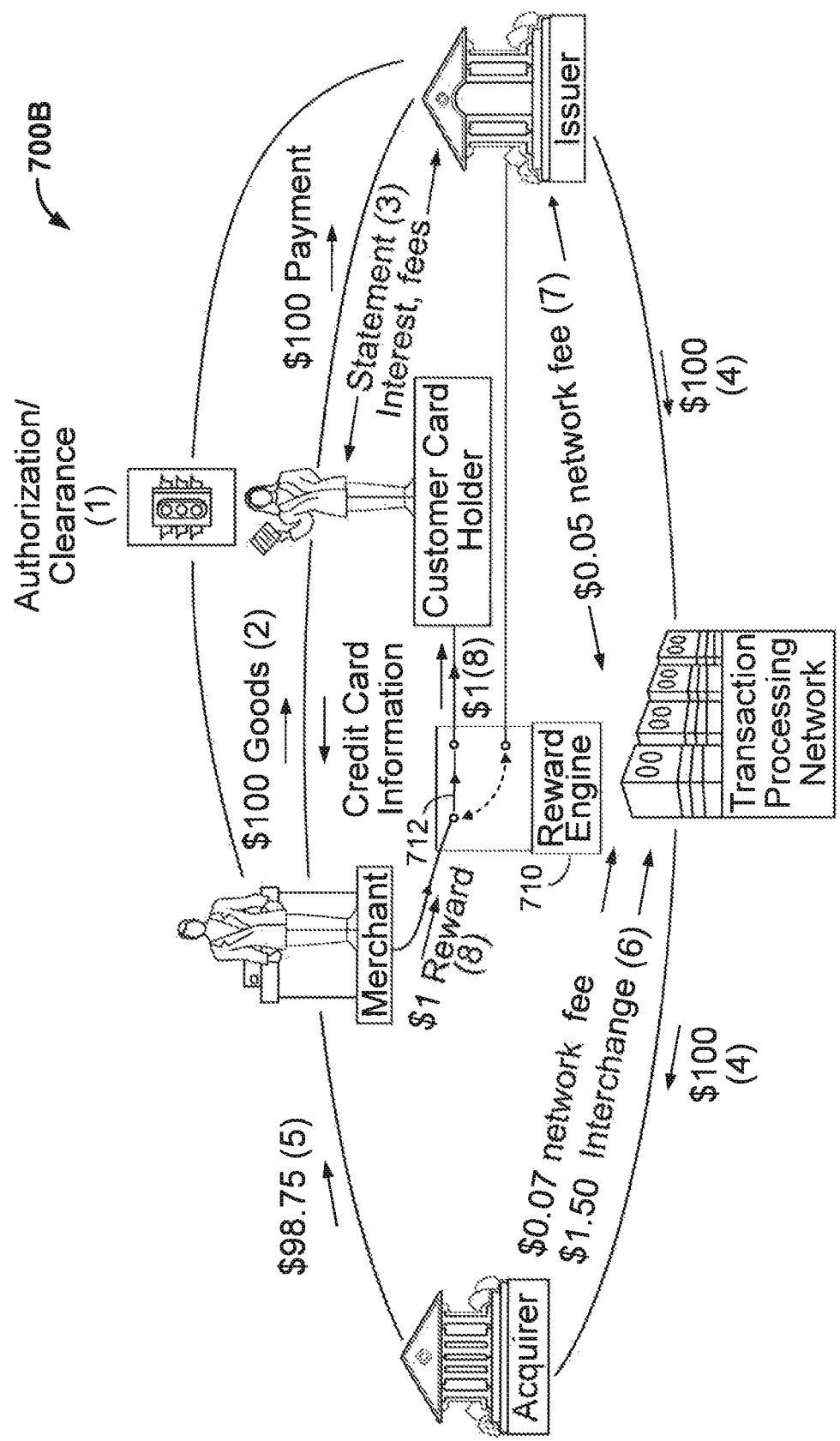
FIG. 7B shows a second orientation of the illustrative system architecture shown in FIG. 7A.

FIG. 7B shows credit card transaction settlement flow 700B. Flow 700B may include features and steps of flow 100 and/or 700A (shown respectively in FIGS. 1 and 7A). For example, flow 700B may involve the transaction participants, such as the merchant, the customer, and the transaction service providers, that are identified above.

At step 1 of FIG. 7B, the merchant provides information, relating to the proposed transaction between the merchant and the customer, to the transaction authorization and clearance provider. The information may include the reward data, such as that the merchant and/or customer have registered for and/or opted into the custom reward program.

At step 2 of FIG. 7B, the merchant provides the $100 in product to the customer. The customer pays with the credit card.

At step 3 of FIG. 7B, the issuer transmits to the customer a statement showing the purchase price ($100.00) due. The issuer collects the purchase price amount, along with the interest and fees if appropriate, from the customer.

At step 4 of FIG. 7B, the issuer routes the purchase price amount ($100.00) through the transaction processing network to the acquirer.

At step 5 of FIG. 7B, the acquirer partially reimburses the merchant for the purchase price amount. In the example shown in FIG. 7A, the partial reimbursement is $98.75. The difference between the reimbursement amount ($98.75) and the purchase price amount ($100.00) is a $1.25 transaction cost.

At step 6 of FIG. 7B, the acquirer pays an interchange amount ($0.75), via the transaction processing network, to the issuer.

At step 7 of FIG. 7B, both the acquirer and the issuer pay the transaction processing network fee ($0.07 for acquirer and $0.05 for the issuer) to the transaction processing network.

At step 8 of FIG. 7B, the merchant pays a reward ($1.00) to the customer. The reward may be routed through custom reward engine 710. Based on the reward data, reward engine 710 may determine the orientation of reward path 712. In the orientation shown in FIG. 7B, the merchant pays the reward to the customer. Based on the orientation of reward path 712 shown in FIG. 7B, the interchange is reduced to $0.75. Illustrative net positions are shown below in Table 4.

TABLE 4

Net positions, by participant, based on
settlement flow 700B (shown in FIG. 7B).

| Participant | Net ($) |
| --- | --- |
| Issuer | 0.70 |
| Acquirer | 0.43 |
| Transaction processing network | 0.12 |
| Merchant | −2.25 |
| Customer | 1.00 |

Figure 8:
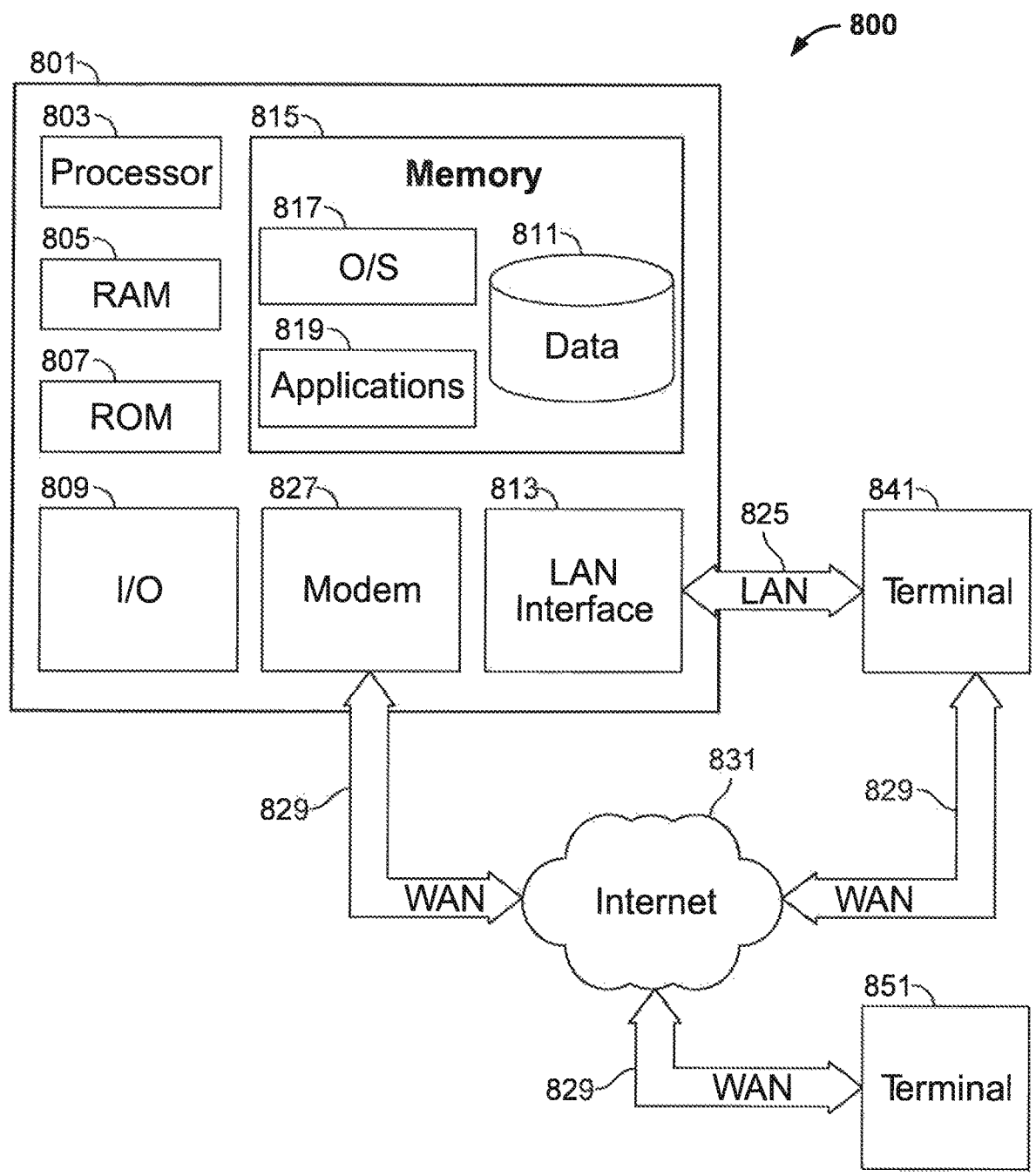
FIG. 8 is a schematic diagram of illustrative architecture in accordance with principles of the invention.

FIG. 8 is an illustrative block diagram of system 800. System 800 may include one or more of the features described in connection with FIGS. 1-7. System 800 may be configured to perform one or more of the steps described in connection with FIGS. 1-7. For example, system 800 may include custom reward engine 710 shown in FIGS. 7A and 7B. Likewise, engine 710 may include some or all features of system 800.

System 800 includes computer 801. Computer 801 may include processor 803. Processor 803 may be configured for controlling operation of system 800. Processor 803 may be configured for controlling operation of associated components of system 800. Computer 801 may include may include RAM 805, ROM 807, input/output module 809, and memory 815. Processor 803 may execute software running on computer 801—e.g., operating system 817. Other components commonly used for computers such as EEPROM or Flash memory or any other suitable components may also be part of computer 801.

Memory 815 may be comprised of any suitable permanent storage technology—e.g., a hard drive. Memory 815 may store software, including operating system 817, application(s) 819, and/or data 811, needed for operation of system 800. Alternatively, or additionally, some or all of the computer-executable instructions may be embodied in hardware or firmware (not shown). Computer 801 may be configured to execute the instructions embodied by the software to perform various functions, such as the step(s) of the method(s).

Input/output ("I/O") module may include connectivity to a microphone, keyboard, touch screen, biometric scanner, sensor(s), camera(s) and/or stylus through which a user of computer 801 may provide input, and may also include one or more speakers for providing audio output and a video display device for providing textual, audiovisual and/or graphical output.

System 800 may be connected to other systems, e.g., via LAN interface 813.

System 800 may operate in a networked environment supporting connections to one or more remote computers, such as terminals 841 and 851. Terminals 841 and 851 may be personal computers or servers that include many or all of the elements described above relative to system 800. The network connections depicted in FIG. 8 include local area network (LAN) 825 and wide area network (WAN) 829, but may also include other networks. When used in a LAN networking environment, computer 801 is connected to LAN 825 through a LAN interface or adapter 813. When used in a WAN networking environment, computer 801 may include modem 827 or other means for establishing communications over WAN 829, such as Internet 831.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 819, which may be used by computer 801, may include computer executable instructions for invoking user functionality related to communication, such as email, Short Message Service (SMS), and voice input and speech recognition applications.

Computer 801 and/or terminals 841 and/or 851 may also include various other components, such as one or more than one battery, speaker, and/or antenna (not shown).

Terminal 851 and/or terminal 841 may include portable device(s) such as a laptop, cell phone, Blackberry™, smartwatch, smart-glasses or any other suitable device for storing, transmitting and/or transporting relevant information. Terminals 851 and/or terminal 841 may include other devices. These devices may be identical to system 800 or different. The differences may be related to hardware components and/or software components.

Figure 9:
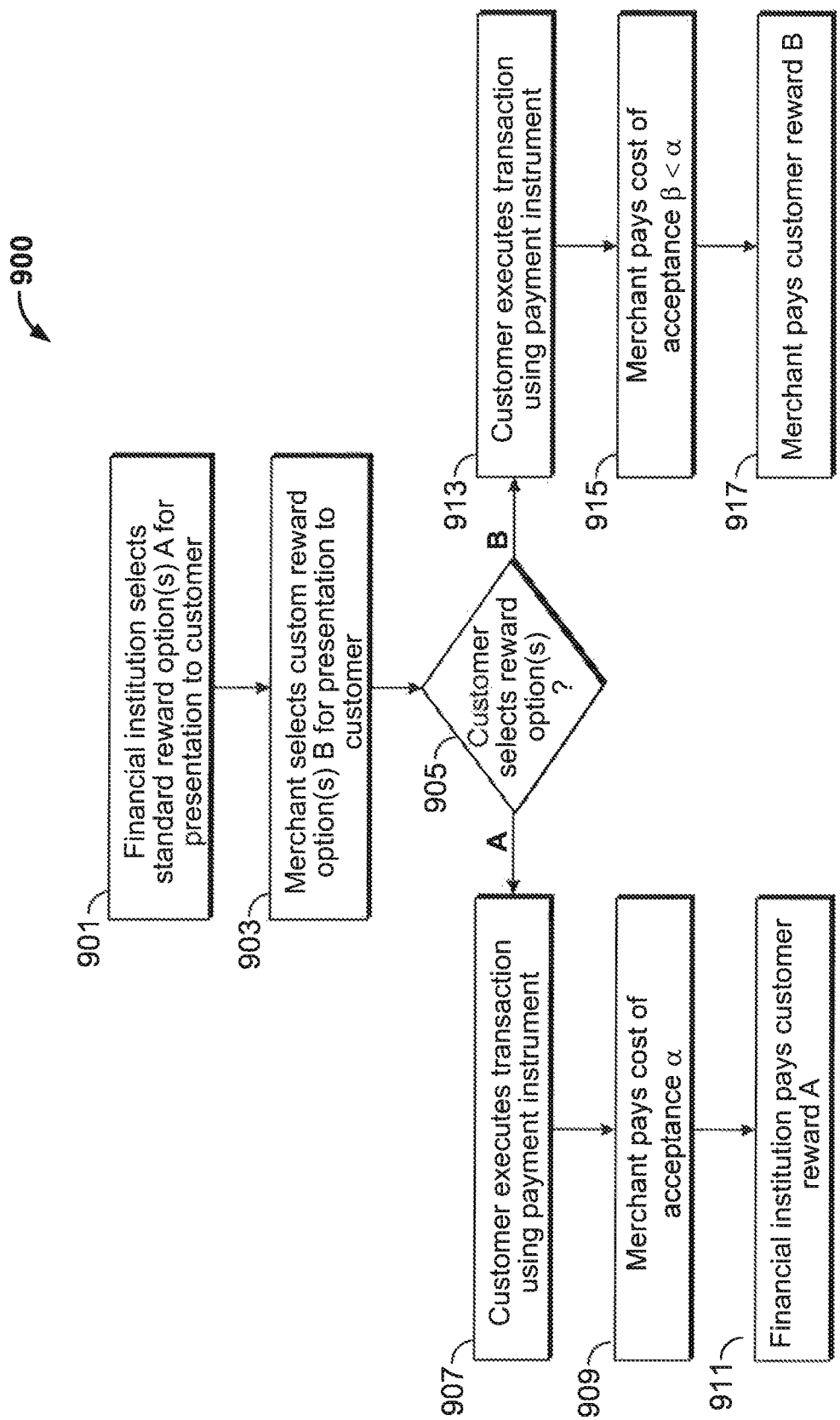
FIG. 9 shows an illustrative flow chart in accordance with principles of the invention.

FIG. 9 shows illustrative process 900. One, some or all of the steps of process 900 may be performed by one or more of apparatus described in connection with FIGS. 1-8, such as by custom reward engine 710, shown in FIGS. 7A and 7B. Process 900 may include one, some or all of the steps described in connection with FIGS. 1-8. Process 900 may begin at step 901.

At step 901, a financial institution, such as an issuer of a payment instrument, selects standard reward option(s) A for presentation to one or more than one customer associated with the payment instrument. Option(s) A may include, for example, cash back, a statement credit, discounts and/or any other suitable benefit providable by the institution. Option(s) A may have a value to the customer. Option(s) A may have a cost to the financial institution. There may be a first difference between the customer value and the institution cost. The first difference may incentivize option(s) A.

At step 903, a merchant selects custom reward option(s) B for presentation to the customer. Option(s) B may include, for example, a discounted product and/or service, an upgraded product and/or service and/or any other suitable benefit providable by the merchant. Option(s) B may have a value to the customer. Option(s) B may have a cost to the merchant. There may be a second difference between the customer value and the merchant cost. The second difference may incentivize option(s) B. The second difference may be less than the first difference. Incentive for option B may be determined to be greater than incentive for option A.

At step 905, the customer may select from presented reward options. The customer may determine which of the presented reward options are of greater value to the customer.

At step 907, the customer may execute one or more than one transaction using the payment instrument. The customer may have selected option(s) A before, during and/or after the executing of the transaction.

At step 909, based on the customer having selected option(s) A, the merchant may pay cost of acceptance α. α may represent any amount. α may be calculated to include costs associated with participating in the transaction. The costs may be related to a cost of funding reward option(s) A.

At step 911, based on the customer having selected option(s) A, the financial institution may deliver reward A to the customer.

At step 913, the customer may execute the transaction(s) using the payment instrument. The customer may have selected option(s) B before, during and/or after the executing of the transaction.

At step 915, based on the customer having selected option(s) B, the merchant may pay cost of acceptance β. β may be an amount less than α. β may be calculated to include costs associated with participating in the transaction. β may be calculated to exclude the cost of funding reward option(s) A.

At step 917, based on the customer having selected option(s) B, the merchant may deliver reward B to the customer.

Thus, systems, methods and apparatus are provided: for custom rewards protocols and system architecture; for delivering customers with incentives to use payment instruments, while also enabling issuers to reduce the magnitude of penalties imposed on merchants; as well as for allowing merchants to control and direct marketing and loyalty of designated brands. Persons skilled in the art will appreciate that the present invention can be practiced by other than the described embodiments, which are presented for purposes of illustration rather than of limitation, and that the present invention is limited only by the claims that follow.

What is claimed is:

1. At least one machine-readable medium storing program code comprising machine-readable instructions for causing at least one processor to perform a method of dynamically incentivizing use of payment instruments, the method being performed by a real-time, dynamic offer platform in communication with a plurality of point-of-sale (POS) merchant devices and in communication with a plurality of customer devices via a mobile application, the method comprising:
   providing, via the plurality of customer devices and the plurality of POS merchant devices, at least one real-time, dynamic offer interface including a graphical user interface, the interface comprising at least one virtual display, the at least one virtual display being displayable on the plurality of customer devices and on the plurality of POS merchant devices;
   causing at least one of the POS merchant devices to transmit, in real-time, at least one selectable reward option, via the platform, to at least one of the customer devices;
   causing the customer device to, upon the transmission of the reward option and via the virtual display, present the transmitted reward option on the virtual display;
   enabling the customer device for receipt, via the virtual display, of a selection of the presented reward option;
   receiving, on the customer device, the selection of the presented reward option;
   causing the customer device to, upon the receipt of the selection, store the selected reward option on the customer device; and
   upon a use of the customer device to finalize a purchase associated with the selected reward option, causing the customer device to communicate with the POS merchant device, said communication including:
      generating a request to the POS merchant device to finalize the purchase associated with the selected reward option;
      termination of a custom communication exchange, the custom communication exchange including communication between the customer device, the POS merchant device, an acquirer and an issuer, the customer communication exchange being associated with an interchange rate; and
      generation of an updated custom communication exchange for transmission from the POS merchant device to the issuer, said updated custom communication exchange comprising:
         an updated interchange rate passed on by the acquirer to a merchant associated with the POS merchant device, said updated interchange rate being less than the interchange rate included in the custom communication exchange; and
         a purchase price associated with the purchase, said purchase price being less than a purchase price included in the custom communication exchange by a value associated with the presented reward option;
   transmission of the updated custom communication exchange from the POS merchant device directly to the issuer, the updated customer communication exchange not being transmitted to the acquirer.

2. The computer-readable medium of claim 1, wherein each of the plurality of POS merchant devices updates offers, transmits additional offers and removes offers in real-time.

3. The computer-readable medium of claim 1, wherein the plurality of customer devices is a first plurality, and the first plurality of customer devices are configured to share the at least one selectable reward option with a second plurality of customer devices.

4. The computer-readable medium of claim 3, wherein:
   each of the second plurality of customer devices is configured to receive a like and/or dislike comment regarding the at least one reward option; and
   the like and/or dislike comment is displayed on the virtual display of customer devices pre-associated with the customer device that received the like and/or dislike comment.

* * * * *